United States Patent
Sridhara et al.

(10) Patent No.: US 10,250,631 B2
(45) Date of Patent: Apr. 2, 2019

(54) RISK MODELING

(71) Applicant: Balbix, Inc., San Jose, CA (US)

(72) Inventors: Vinay Sridhara, Santa Clara, CA (US); Vansh Pal Singh Makh, San Francisco, CA (US); Gaurav Banga, Cupertino, CA (US); Rajarshi Gupta, Sunnyvale, CA (US)

(73) Assignee: Balbix, Inc., San Jose, CA (US)

(*) Notice: Subject to any disclaimer, the term of this patent is extended or adjusted under 35 U.S.C. 154(b) by 165 days.

(21) Appl. No.: 15/383,656

(22) Filed: Dec. 19, 2016

(65) Prior Publication Data
US 2018/0048668 A1 Feb. 15, 2018

Related U.S. Application Data

(63) Continuation-in-part of application No. 15/234,980, filed on Aug. 11, 2016, and a continuation-in-part of application No. 15/234,970, filed on Aug. 11, 2016.

(51) Int. Cl.
 *H04L 29/06* (2006.01)
(52) U.S. Cl.
 CPC ...... *H04L 63/1433* (2013.01); *H04L 63/1425* (2013.01)
(58) Field of Classification Search
 CPC .................. H04L 63/1433; H04L 63/1425
 See application file for complete search history.

(56) References Cited

U.S. PATENT DOCUMENTS

| | | | | |
|---|---|---|---|---|
| 8,413,249 | B1* | 4/2013 | Chou | G06F 8/75 713/188 |
| 9,336,385 | B1* | 5/2016 | Spencer | H04L 63/1441 |
| 9,501,647 | B2* | 11/2016 | Yampolskiy | H04L 63/1433 |
| 2010/0162401 | A1* | 6/2010 | Sakaki | G06Q 10/10 726/25 |
| 2010/0333002 | A1* | 12/2010 | Karabey | G06Q 10/10 715/764 |
| 2012/0110669 | A1* | 5/2012 | Beresnevichiene | G06F 21/577 726/25 |

(Continued)

OTHER PUBLICATIONS

Ko et al., "Policy Modeling in Risk-driven Environment", Sep. 2011, ACM, pp. 195-203. (Year: 2011).*

*Primary Examiner* — Matthew Smithers
(74) *Attorney, Agent, or Firm* — Brokaw Patent Law PC; Christopher J. Brokaw

(57) ABSTRACT

Approaches for modeling a risk of security breaches to a network. Agents gather, from multiple sources across the network, analysis data that identifies observed characteristics of habitable nodes and opaque nodes. Using the analysis data a multi-layer risk model for the network is generated that comprises a first layer that models an inherent risk of security breaches to assets of the network based on the observed characteristics. The model also comprises a second layer that models a present state of the inherent risk to the assets caused by global and temporal events. The model also comprises a third layer that models a change to the risk of security breaches in response to potential mitigative actions. The model may be used to understand how risk of a security breach is distributed and interdependent upon the nodes of the network so as to allow the most valuable preventive measures to be taken.

22 Claims, 21 Drawing Sheets

(56) References Cited

U.S. PATENT DOCUMENTS

| | | | |
|---|---|---|---|
| 2012/0210388 A1* | 8/2012 | Kolishchak | G06F 21/552 726/1 |
| 2014/0317734 A1* | 10/2014 | Valencia | G06F 21/552 726/22 |
| 2014/0337971 A1* | 11/2014 | Casassa Mont | G06F 21/552 726/22 |
| 2015/0332054 A1* | 11/2015 | Eck | H04L 63/1433 726/25 |
| 2016/0099953 A1* | 4/2016 | Hebert | H04L 63/1416 726/23 |
| 2016/0134653 A1* | 5/2016 | Vallone | H04L 63/1433 726/25 |
| 2016/0205122 A1* | 7/2016 | Bassett | G06F 21/577 726/23 |
| 2017/0359366 A1* | 12/2017 | Bushey | H04W 4/38 |

\* cited by examiner

Risk Categorization

| Legal Access | Illegal Access | Bypass Access |
|---|---|---|
| • Trust Relationships<br>• Malicious Insider | • Lost/Stolen Credentials<br>• Weak Passwords<br>• Man-in-the-Middle | • Unknown Vulnerabilities<br>• Unpatched Vulnerabilities<br>• Misconfiguration<br>• Fool User / Phishing |

BREACH METHODS

FIG. 4A

| Reconn/Propagate | Exfiltrate |
|---|---|
| Lie in Wait | Disrupt/Destroy |

IMPACT TYPES

FIG. 4B

| Comment | Company Type | Device Type | File Type | Num Files | File Source | Impact |
|---|---|---|---|---|---|---|
| Vector1 | Tech | Laptop | PDF | 233 | User | 1000 |
| Vector2 | Tech | Desktop | JPG | 20 | Internet | |
| Vector3 | Tech | Server | EXE | 7500 | OS | 100 |
| Vector4 | Legal | Laptop | PDF | 75 | User | 1000 |
| Vector5 | Legal | Server | EXE | 4332 | OS | 100 |
| Vector6 | Legal | Laptop | DOC | 300 | User | |
| NEW | | | | | | |
| Vector7 | Legal | Laptop | PDF | 180 | User | ?=>120 0 |
| Vector8 | Tech | Desktop | EXE | 2886 | OS | 90 |
| Vector9 | Legal | Laptop | PDF | 9765 | User | 5 |

FIG. 13

Types of Insights

- Configuration Vulnerabilities
  - A configuration on the device is causing the risk on some BMT axis to be high > Driver: Man-in-the-Middle
  > Detail: Port 513 is open
  > Observation: rlogin does not support encryption

- Software Vulnerabilities
  - Installed software on the device is old, or has known vulnerabilities > Driver: Unpatched Vulnerability
  > Detail: Open ssh ports on network devices
  > Observation: ssh 4.1.1 (CVSS 8.3)

- Behavioral Vulnerabilities
  - Usage or behavior on the device is enhancing its risk on some BMT axis > Driver: Lost or stolen credentials
  > Detail: Browsing on unsafe sites
  > Observation: 30% of browsing on non-Alexa-1000

FIG. 16

Impact ML model based on multiple features

| | Other | PC | Server/Storage | Network | Infrastructure Servers | Infrastructure Network |
|---|---|---|---|---|---|---|
| EXAMPLES | IoT, VoIP, Phone, PoS, Other Core | Laptops, desktops | Cloud, App Servers | WiFi AP, Router/Switch | AD, DNS, DHCP, Mail | Core Router, FW, VPN, IPS/IDS, Proxy |
| FEATURES | DevType & DevSubType | DevType & DevSubType | DevType & DevSubType | DevType & DevSubType | DevType & DevSubType | DevType & DevSubType |
| | OrgType, BU | OrgType, BU [AD] | OrgType, BU [AD] | | | |
| | | | Role | Role | Role | Role |
| | | Size & filetype (how much) [HA] | Size & filetype (how much) [HA] | | Scope (how many customers) | Scope (how many customers) |

FIG. 18

RISK MODELING

CLAIM OF PRIORITY

This application is a continuation-in-part of, and claims priority to, U.S. patent application Ser. No. 15/234,970, entitled "Comprehensive Modeling and Mitigation of Security Risk Vulnerabilities in an Enterprise Network," filed on Aug. 11, 2016, invented by Gaurav Banga et al., and which is hereby incorporated by reference for all purposes as if fully set forth herein.

This application is also a continuation-in-part of, and claims priority to, U.S. patent application Ser. No. 15/234,980, entitled "Mitigation of Security Risk Vulnerabilities in an Enterprise Network," filed on Aug. 11, 2016, invented by Gaurav Banga et al., and which is hereby incorporated by reference for all purposes as if fully set forth herein.

FIELD OF THE INVENTION

Embodiments of the invention generally relate to modeling the risk of security breaches to a network.

BACKGROUND

Despite the extraordinary effort expended to prevent security breaches, the frequency and severity of security breaches continue to increase over time. Digital security has proven to be a more complicated and extensive problem than what had been previously envisioned.

Most modern approaches for combating malware rely upon identification and containment. The general premise behind most anti-virus software is the assumption that digital signatures of previously identified malware may be used to identify malware encountered in the future. This strategy is not successful when the malware has not been previously encountered or has mutated over time to possess a different digital signature. Other firewalls and anti-virus software both operate under the presumption that malware may be identified by tell-tale features or behavioral characteristics. However, in practice, customized malware designed to breach the specific defenses of a particular enterprise network may be crafted in hours or days. Consequently, the malware encountered by any organization of substantial magnitude is often unique to that organization. Approaches which rely upon recognizing previously encountered malware traits and patterns are thus hobbled out of the gate.

Consequently, approaches for improving the privacy and security of a computer network are not only welcome, but vital to the health of our increasing computerized society.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 4A is an illustration of different risk categories addressed by embodiments of the invention;

FIG. 4B is an illustration of exemplary impact types which are addressable by embodiments of the invention;

FIG. 13 is a table depicting feature vectors according to an embodiment of the invention;

FIG. 16 is an illustration of several exemplary types of Insights and a set of actionable risk drivers according to embodiments of the invention;

FIG. 18 is an illustration of an example impact model according to an embodiment;

DETAILED DESCRIPTION OF THE INVENTION

Figure 1:
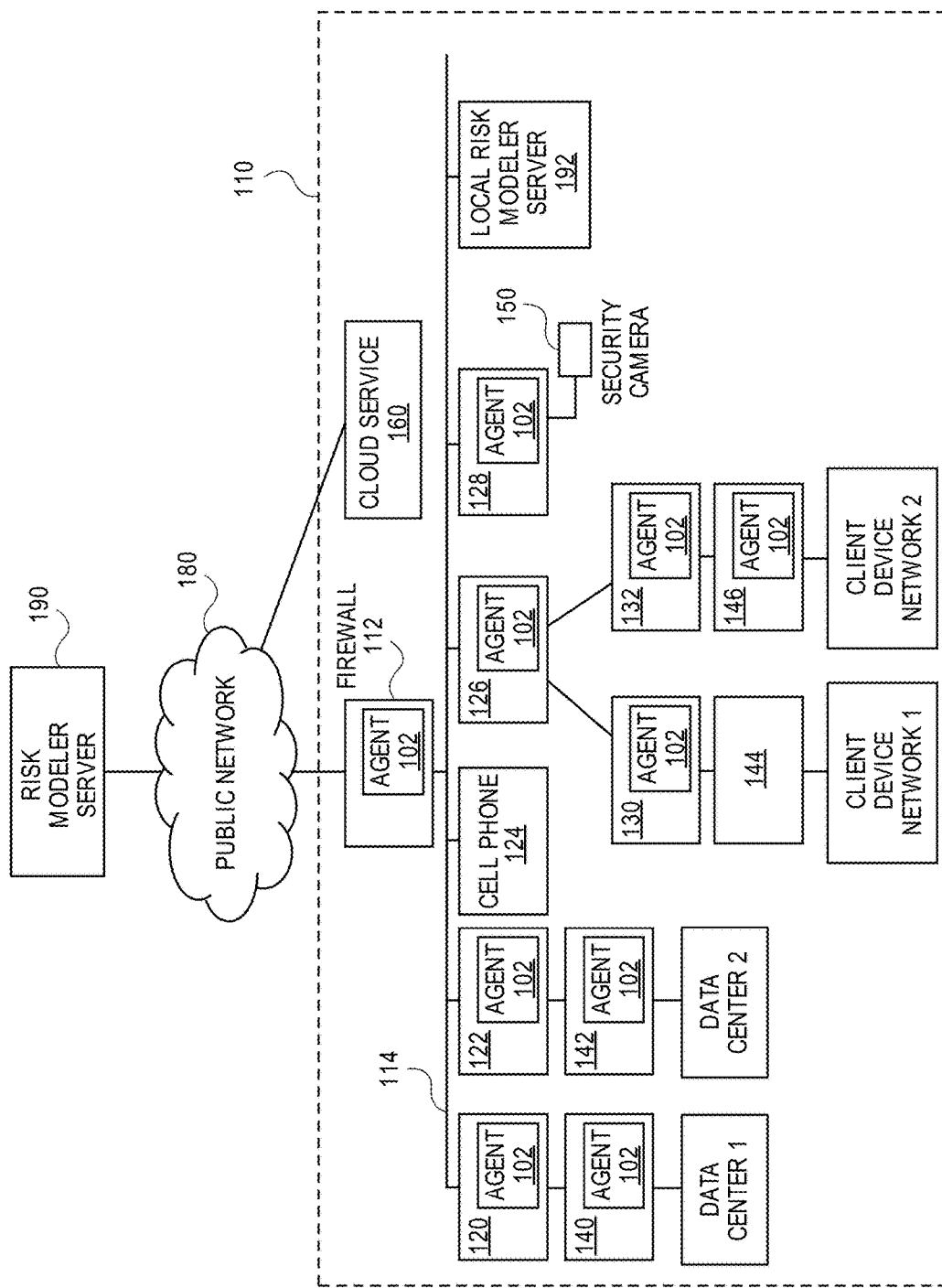
FIG. 1 is a block diagram of a system according to an embodiment of the invention.

Approaches for modeling the risk of security breaches to a network are presented herein. The approaches discussed herein may be used to precisely and quantitatively identify risk exposure for digital assets and evaluate how that risk exposure can be mitigated through specific courses of action. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Virtually all modern enterprises employ an internal network to which a large number of devices are connected. In addition to the networked computers and digital assets of the enterprise, each employee often uses multiple computerized devices in the course of their duties and daily life, such as a personal computer, laptop computer, cell phone, and the like. Each of these large number of devices coupled to the enterprise network is a separate potential attack vector against the enterprise.

The term "Internet of Things" has been widely adopted to refer to the widely followed trend of connecting a variety of electronic devices to a computer network. Enterprises shoulder an ever-increasing risk from attack from such unlikely sources, such as a networked flat screen television used in a conference room or a web-enabled security camera which can connect to the Internet and the enterprise's intranet.

Embodiments of the invention operate under the observation that customized malware and computerized attacks against the digital resources of an enterprise are designed to target the perceived weakest link in the exposed perimeter of the enterprise network. By way of analogy, embodiments presume that attacks will attempt to breach a wall by building a ladder to clamber over the lowest point in the wall, and so, continuing with this analogy, resources and attention are better spent shoring up the lowest point in the wall rather than other locations in the wall which are reasonably impregnable in view of the assets being protected behind the wall.

Embodiments of the invention may be used to programmatically identify, via a systematic and methodical process, all devices, or nodes, which are connected to a computer network. Further, embodiments enable an administrator of an enterprise network to generate a complete list of assets on the network and the location at which those assets are stored. As used herein, an asset on the network refers to units of digital information. Digital assets of a company include their trade secrets, work product, images, files, and any digital content belonging to the company.

Embodiments of the invention can also ensure that all devices connected to the computer network are used appropriately, i.e., in a manner of which the enterprise or owner approves. In other words, embodiments can be used to ensure that all devices connected to a computer network are used by appropriate personnel and in an approved manner.

Further, embodiments may analyze each device connected to an enterprise network to determine the risk to the enterprise presented by that device. Approaches for presenting information, in a variety of different ways, that describes the risk to the privacy and integrity of the enterprise network based on the computerized enterprises' assets will be discussed. For example, embodiments may depict a risk heat map which graphically depicts the risk to the enterprise's assets posed by of all the enterprise's network-connected devices. The risk heat map may be overlaid with the enterprises' organizational chart, network diagram, and other illustrations which may intuitively impart information to the viewer.

To determine the risk to the enterprise presented by each network-connected asset, embodiments may develop and maintain an enterprise risk model that models the risk to the security and integrity of the enterprise presented by each asset. The enterprise risk model may model both the present and the future risk to the enterprise; thus, unlike certain prior approaches, the enterprise risk model is instructive on what may happen in the future. By using the enterprise risk model to gather intelligence about present and future risks of security breaches, resources, such as time and money, may be best allocated in a targeted and methodical manner to improve the risk profile of the enterprise network until an acceptable level of risk is achieved.

The features discussed above are intended to provide a high level overview of certain capabilities of several embodiments, but not a complete enumeration of all the features of all embodiments discussed herein.

System Overview

FIG. 1 is a block diagram of a system according to an embodiment of the invention. FIG. 1 depicts an enterprise network 110, a public network 180, and risk modeler servers 190 and 192 of an embodiment. Enterprise network 110, as broadly used herein, represents any computer network belong to or used by any entity, such as but not limited to a company, an enterprise, an organization, a government, or any other entity. Enterprise network 110 represents any type of computer network and is not limited to, or dependent upon in any respect, any particular type of operator of the network.

For clarity, enterprise network 110 is depicted in FIG. 1 as comprising a handful of devices; however, in practice, enterprise network 110 may comprise many hundreds of thousands of devices or more. Moreover, the arrangement of devices in enterprise network 110 shown in FIG. 1 is merely a simplified example, as embodiments of the invention do not require any particular logical arrangement of devices in enterprise network 110. Thus, it should be understood that enterprise network 110 may constitute any arrangement of devices configured in any conceivable manner.

A wide variety of different devices may be connected to enterprise network 110, including electronic devices not classically thought of as a computer. For this reason, as broadly used herein, any electronic device capable of communicating with enterprise network 110 shall be referred to herein as a node. Thus, non-limiting examples of nodes of enterprise network 110 include those typically associated with the term computer, such as a personal computer (PC), a laptop computer, a server, a router, a printer, a desk phone, a tablet device, a personal digital assistance (PDA), a firewall server 112, a mainframe, and the like. Other non-limiting examples of nodes of enterprise network 110 include those not typically associated with the term computer, such as a cell phone 124, a television, a digital security camera 150, wearable technology, security systems, web-enabled appliances, a digital video recorder (DVR), a game console, and the like.

As used herein, the term 'perimeter' refers to those nodes of enterprise network 110 which directly communicate with public network 180. For example, a node of enterprise network 110 which allows the user to use a web browser or access their web-based personal email account shall be said to reside on the perimeter of enterprise network 110, regardless of where that node physically exists or disposed within the logical or physical structure of enterprise network 110.

If a node is not on the perimeter of enterprise network 110, then the node is said to reside in the core of enterprise network 110. Thus, if a node is in the core of enterprise network 110, that node does not directly communicate with public network 180; however, a node in the core of enterprise network 110 can communicate with other nodes of enterprise network 110 over Intranet 114. It is strategically advantageous for important assets to reside in the core, rather than the perimeter, given that the core is insulated from security breaches to a certain extent by the perimeter.

Figure 2:
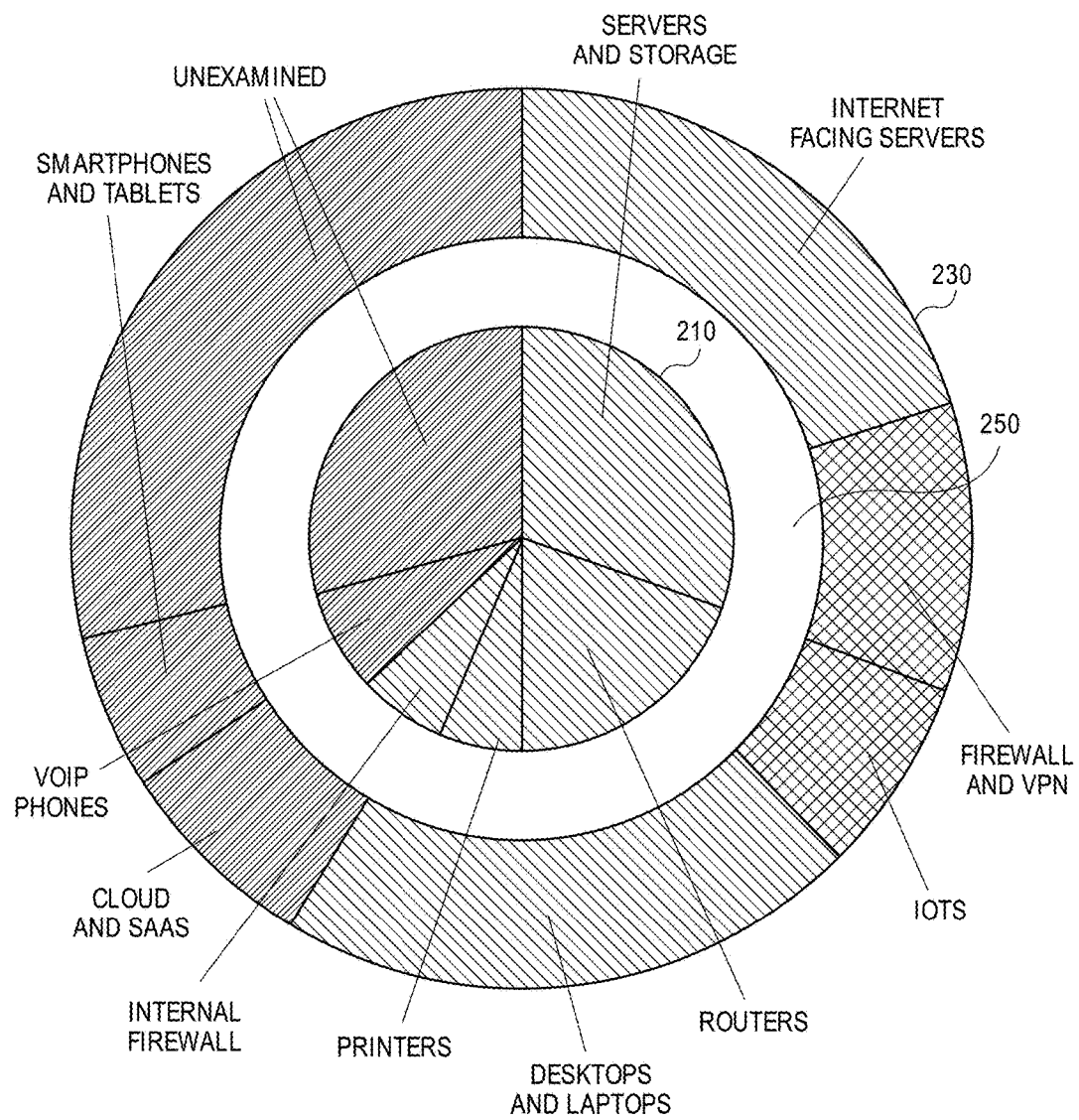
FIG. 2, which is a diagram illustrating the core and perimeter of an enterprise network according to an embodiment of the invention.

To illustrate characteristics of the core and perimeter, consider FIG. 2, which is a diagram illustrating the core 210 and perimeter 230 of an exemplary enterprise network according to an embodiment of the invention. Core 210 may comprise resources secured against direct access to public network, e.g., nodes of a data center, Point of Sale (PoS) nodes, private cloud(s), and other assets, which are often not directly exposed to public networks such as the Internet. In the exemplary embodiment of FIG. 2, core 210 comprises servers and storage, routers, printers, Internet firewalls, Voice Over IP (VOW) telephones, and certain miscellany/unexamined assets.

Perimeter 230 may comprise resources directly accessible over, or connected to, public network 180, e.g., a perimeter may comprise public cloud services, firewall and virtual private network devices, Internet facing servers, misconfigured or incorrectly used core systems, and virtual desktop interface (VDI) client endpoints. In the exemplary embodiment of FIG. 2, perimeter 230 comprises Internet facing servers, firewall and Virtual Private Networks (VPNs), Internet of Things (JOT) nodes, desktops and laptops, Cloud and Software as a Service (SAAS) nodes and services, and certain miscellany/unexamined assets. Those skilled in the art shall appreciate that FIG. 2 depicts one example of an arrangement of nodes split between a perimeter and a core and that any number of arrangements may be used in practice.

Note that enterprises may not always know with precision which nodes of enterprise network 110 reside in perimeter 230 and which reside in core 210. Thus, a misconfigured or incorrectly used core system could expose certain assets to perimeter 230, thereby rendering those assets more vulnerable to a security breach.

A zone of propagation (ZoP) 250 exists between perimeter 230 and core 210. In certain prior approaches, zone of propagation 250 offered no resistance or barriers to intruders once perimeter 230 was breached. Thus, once one node in core 210 is breached by a malicious attacker, then that attacker can use that compromised node to launch other attacks against any targets in core 210, thereby jeopardizing the assets of core 210. Various approaches for allowing zone of propagation 250 to act as a resistant barrier to thwart security breaches by malicious parties and/or insiders according to embodiments of the invention shall be discussed below.

Figure 3:
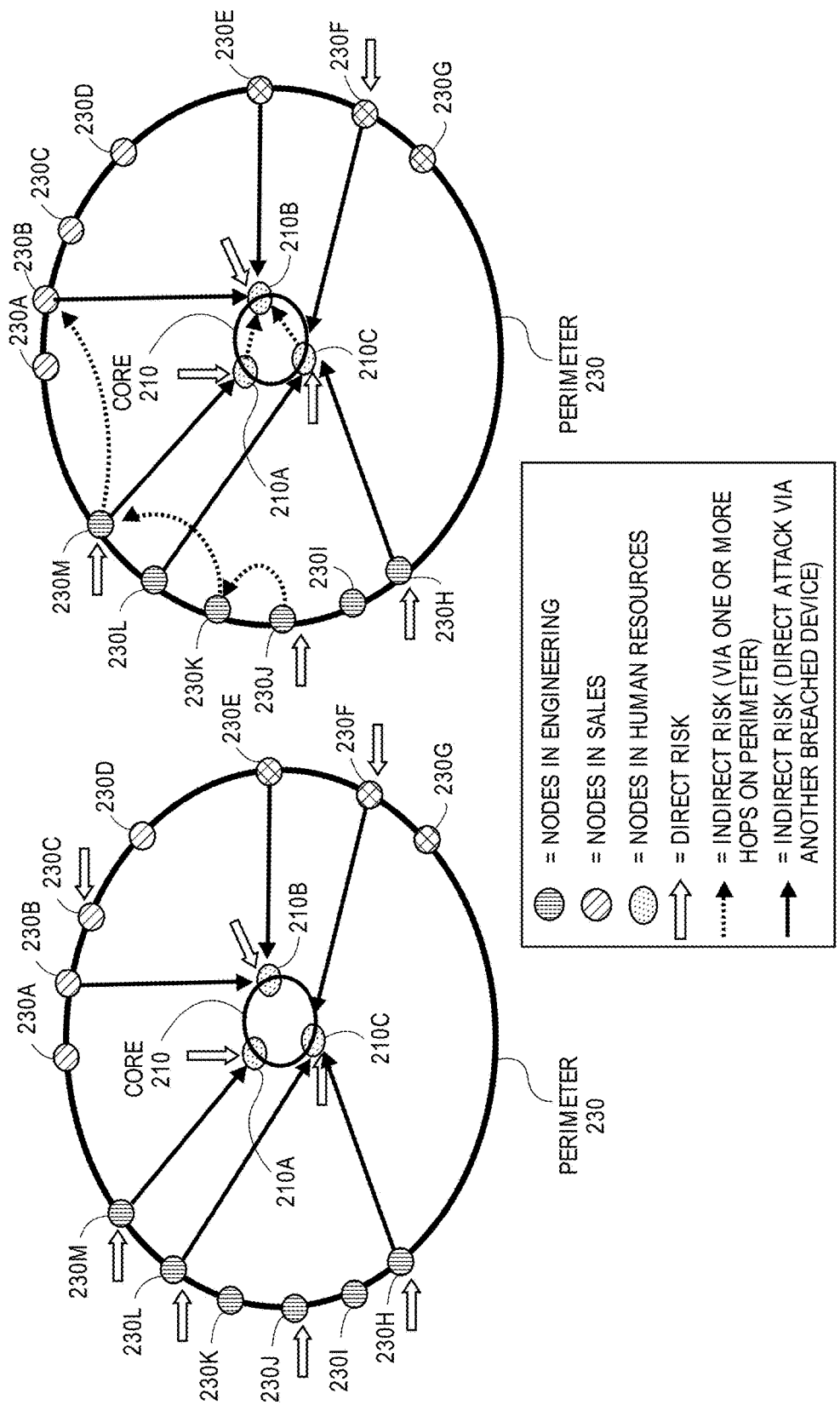
FIG. 3 is a diagram illustrating attack paths into the core and an enterprise network according to an embodiment of the invention.

FIG. 3 is a diagram illustrating attack paths into the core and an enterprise network according to an embodiment of the invention. As shown in FIG. 3, a malicious attacker may directly attack one or more of nodes on perimeter 230. For example, nodes 230C, 230F, 230H, 230J, 230L, and 230M may pose a direct risk to a security breach. After compromising a node on perimeter, the attacker may then indirectly attack nodes located in core 210. For example, if node 230M is compromised via a direct attack, then an indirect attack against node 210A in core 210 may be made by way of node 230M. Alternately, if node 230M is compromised, then an indirect attack against node 210B either via node 210A (1 hop) or 230B (2 hops) may made via node 230M. Thus, as nodes on perimeter 230 become compromised, additional attack vectors into core 210 may become available.

Certain nodes on perimeter 230 of enterprise network 110 may include related assets and services capable of affecting the privacy and integrity of enterprise network 110 while nevertheless being out of the direct control of the operator of enterprise network 110. For example, cloud-services, such as cloud-service 160, used by the enterprise also reside on the perimeter of enterprise network 110. As another example, the personal mobile devices (such as a personal, non-work related cell phone 124) used by employees or authorized users of enterprise network 110, which may contain work related information (such as but not limited to passwords and digital credentials) as well as personal information, are also on the perimeter of enterprise network 110.

FIG. 1 depicts an example arrangement of nodes of enterprise network 110. As depicted in FIG. 1, nodes 120, 122, 124, 126, 128, 130, 132, 140, 142, 144, 146, 150, and 160 are arranged in a logical structure and communicate over Intranet 114. Data center 1 and 2 as well as client device network 1 and 2 depicted in FIG. 1 may each comprise any number of nodes in any arrangement.

Public network 180 is intended to represent any type of publically accessible network, such as but not limited to the Internet.

Risk modeler server 190, as broadly used herein, refers to one or more servers accessible by enterprise network 110 over public network 180. Thus, while FIG. 1 depicts risk modeler server 190 as a single entity, in practice risk modeler server 190 may be implemented on two or more servers for scalability and fault-tolerant purposes. The role played by risk modeler server 190 in various embodiments shall be explained below; however, in brief, risk modeler server 190 may install one or more agents onto nodes of enterprise network 110. These agents will disperse over the nodes of enterprise network 110 and will provide, to risk modeler server 190, information (termed "analysis data") used by risk modeler server 190 to build an enterprise risk model, such as enterprise risk model 500 depicted in FIG. 5. Risk modeler server 190 may thereafter receive information from one or more sources, such as for example the agents installed on enterprise network, learned professionals, and information about current events, to refine and perfect enterprise risk model 500 over time.

Local risk modeler server 192, as broadly used herein, refers to one or more servers accessible by enterprise network 110 over Intranet 114. Thus, while FIG. 1 depicts local risk modeler server 192 as a single entity, in practice local risk modeler server 192 may be implemented on two or more servers for scalability and fault-tolerant purposes.

Local risk modeler server 192 may perform certain responsibilities instead of, or in tandem with, risk modeler server 190. Certain embodiments may only include one of risk modeler server 190 and local risk modeler server 192; thus, if either risk modeler server 190 and local risk modeler server 192 is present the other may, but need not, also be present.

Embodiments may employ local risk modeler server 192 without employing risk modeler server 190 in situations where privacy is of paramount concern, as no data will be transmitted over public network 180. Risk modeler server 190 may be used with a single enterprise network or a plurality of enterprise networks; thus, in certain embodiments, risk modeler server 190 may have the benefit of refining the enterprise risk model using a plethora of information collected from a plurality of enterprise networks.

Modeling Different Attack Vectors

Embodiments of the invention may be used to scientifically assess the risk posed to digital assets from a variety of attack vectors. In an embodiment, the one or more agents 102 executing on certain nodes of enterprise network 110 may collect certain data ("analysis data") about nodes of enterprise network. The analysis data collected by the one or more agents may then be transmitted to risk modeler server 190 or local risk modeler server 192 for subsequent analysis. The analysis data may identify, for a particular node, be it a habitable node or an opaque node, certain relative vulnerabilities of that node.

FIG. 4A is an illustration of risk categories addressed by embodiments of the invention. The relatively likelihood of a particular node experiencing and/or succumbing to the categories of attack vectors shown in FIG. 4A may be analyzed by an enterprise risk model and the analysis data received from the one or more agents 102.

In an embodiment, the analysis data, sent from a particular agent 102 to either risk modeler server 190 or local risk modeler server 192, may comprise data describing a node's vulnerabilities or exposure to certain breach methods or attack vectors, such legal access, illegal access, and bypass access. The legal access breach method corresponds to a security breach perpetrated by a trusted user or trusted entity. Non-limiting examples of a legal access breach methods include activity by a malicious user who has legitimate access to the node (in other words, a "malicious insider") or activity initiated at another node which is trusted (but may be compromised by malicious software).

The illegal access breach method corresponds to a security breach perpetrated vis-à-vis the malicious acquisition of credentials. For example, the analysis data collected by an agent 102 may comprise password information that describes how passwords are used on a particular node. This password information may identify any weak passwords employed by the particular node, any shared passwords used by the particular node and another entity other than said particular node, and whether the particular node does not require a password to access certain assets or services. In this way, the enterprise risk model may assess the vulnerabilities of credentials used by nodes of enterprise network 110 for purposes of quantifying the risk posed thereby and providing a relative measure of how that risk differs from node to node and from an acceptable baseline level.

The bypass access breach method corresponds to a security breach perpetrated by a software vulnerability used to bypass the access control system. For example, a bypass access breach method may be a software bug or glitch that allows the attacker to bypass the access control system. Non-limiting, illustrative examples of a bypass access breach method include zero day attacks, unpatched software vulnerabilities, and man-in-the-middle attacks. Certain software installed on a node may be more vulnerable to zero day attacks or may require more frequent software patches. These vulnerabilities may be assessed by agents 102 and those determinations may be communicated to risk modeler server 190 or local risk modeler server 192 for further study and review.

FIG. 4B is an illustration of exemplary impact types which are addressable by embodiments of the invention. The enterprise risk model of an embodiment may be adapted to assess the risk of a variety of impacts imposed by malicious code and actions.

Certain types of malicious code and actions may seek to perform reconnaissance across network 110. This may involve propagating malicious code across network 110 or otherwise gaining access to nodes and data thereon. Another impact type involves a lie in wait approach where malicious code may be introduced into a node of network 110 in a dormant state until such time the malicious code may take some nefarious action or replicate itself across network 110.

Malicious code and actions may also impact network 110 by exfiltration or stealing data or other digital assets of a company or organization. Additionally, network 110 may be impacted by malicious code or actions designed to disrupt operations or delete and/or destroy digital and/or physical assets of the company.

The impacts types shown in FIG. 4B are examples of the types of consequences which may be mitigated by an enterprise risk model of an embodiment; however, may other such impacts may be modeled, assessed, and mitigated by embodiments of the invention.

Generating the Multi-Layer Model

Figure 5:
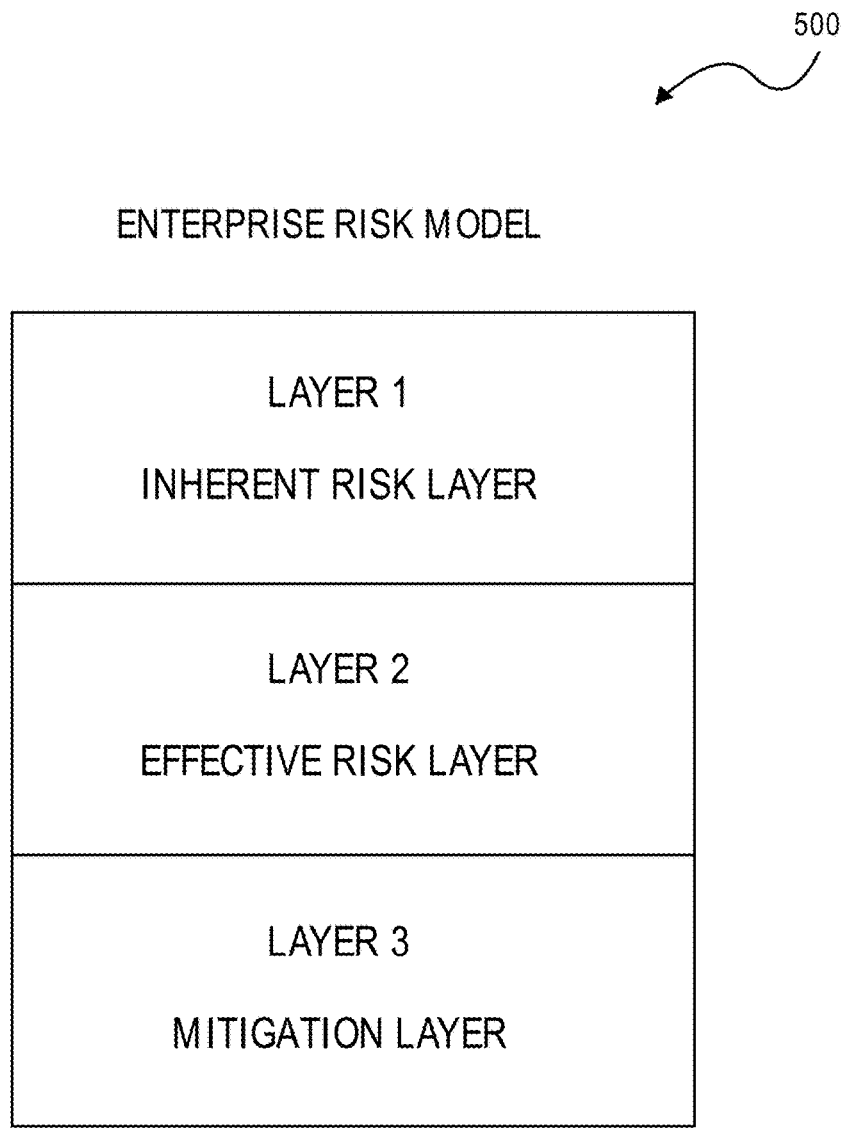
FIG. 5 is an illustration of an enterprise risk model according to an embodiment of the invention.

The enterprise risk model of an embodiment may comprise a variety of different layers so that a variety of different nuances and complexities may be modeled and considered. FIG. 5 is an illustration of an enterprise risk model 500 according to one embodiment of the invention. As shown in FIG. 5, enterprise risk model 500 may comprise a layer (termed an "inherent risk layer" or layer 1) that models an inherent risk presented to the enterprise network based on static features of the enterprise network. The inherent risk layer may also model the risk presented to the enterprise from both authorized and unauthorized users of the network.

An enterprise risk model of an embodiment may also comprise a layer (termed a "effective risk layer" or layer 2) that models a present state of risk to the enterprise network caused by dynamic conditions, such as global and temporal events. Global events refer to present attributes concerning the geographical location in which certain nodes are currently physically located. For example, if a laptop is physically located in a data center located in the headquarters of a United States enterprise, and the laptop is attempting to perform a certain action, such as accessing a document, then that action may be deemed more safe or less risky relative to the same action performed by the same laptop when the laptop is physically located in the airport of foreign country. In the latter case, the dynamic risk layer model will identify the action as possessing more risk not due to anything doing what the laptop itself, but rather based on the fact that the laptop is located in the airport of a foreign country. As another example, if it is known that there is a presently occurring terrorist attack or other act of widespread civil disobedience in a particular country or region, then nodes presently located in that country or region may be deemed more risky based on that event.

The dynamic risk layer may model the present state of risk based on temporal or time dependent information. For example, if a known type of computer attack is occurring, then the nodes of enterprise network 110 possessing a computing environment susceptible to the presently occurring computer attack may be deemed more risky during the computer attack. Other examples of time dependent information include what actions the node is currently performing and/or what software is currently being executed, e.g., web-browsing is an intrinsically risky behavior and anytime it is conducted a certain amount of risk is assumed.

Accordingly, the dynamic risk layer receives two different inputs, namely information about presently occurring global threats and time dependent or temporal events. As new information is learned, the dynamic risk layer may be updated and refined.

The enterprise risk model of an embodiment may also comprise a layer (termed a "mitigation layer" or layer 3) that models a reduction in risk to the enterprise network in response to the performance of potential mitigative actions. The mitigation layer of multi-layer model 500 may be used to explore how the performance of potential mitigative actions improves the risk assigned to the assets of enterprise network 110. The mitigation layer can be used to determine what actions should be taken so that the assets of enterprise network all pose an acceptable risk to the operator of network enterprise 110. Risk cannot be completely eliminated, as all activity assumes a certain amount of risk. However, at some point, the cost of protecting the assets of network enterprise 110 from further risk may not justify, in the eyes of the operator of enterprise network 110, further time and money spent improving the security of network enterprise 110. Moreover, if it is determined that a potential mitigative action is desired, then mitigation layer of multi-layer model 200 may be used to scientifically determine the cost involved and the resulting desirable impact to the risk profile of enterprise network 110, which can help in evaluating whether a potential mitigative action is worth the expenditure of resources.

Enterprise risk model 500 is generated by scientifically observing all nodes and assets of enterprise network 110. Using enterprise risk model 500, embodiments are able to predict, analytically and scientifically, the nodes of enterprise network 110 which are likely presently compromised and the likelihood of each node of enterprise network 110 becoming compromised in the future. In addition to identifying the relative likelihood of each node of enterprise network 110 becoming compromised in the future, enterprise risk model 500 may be used by embodiments to predict the likelihood of how those nodes will likely be breached or compromised by malicious code in the future.

Figure 6A:
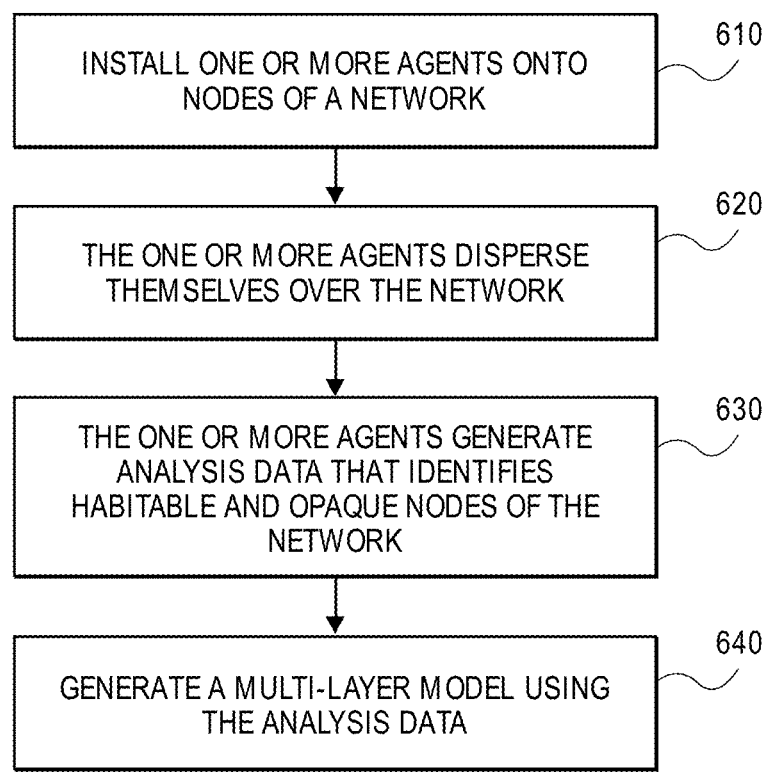
FIG. 6A is a flowchart illustrating the steps of analyzing the security of a network according to an embodiment of the invention.

FIG. 6 is a flowchart illustrating the steps of analyzing the security of a network according to an embodiment of the invention. Note that the sequence of steps illustrated in FIG. 6 may be performed in a difference sequence than that depicted. For example, certain steps of FIG. 6 may be performed in parallel with one another or certain steps may be repeatedly performed. Thus, the logical progression of steps depicted in FIG. 6 is merely for explanation purposes and practical embodiments may employ any of the steps of FIG. 6 when appropriate.

In step 610, one or more agents 102 are installed onto nodes of enterprise network 110. Either risk modeler server 190 or local risk modeler server 192 may be the source of the dissemination of agents 102 onto one or more nodes of enterprise network 110 in step 610. Alternatively, agents 102 may be installed and managed by any other software provisioning server. As step 610 is performed with the blessing of the operator of enterprise network 110, the operator of enterprise network 110 may permit risk modeler server 190 to access enterprise network 110 by providing sufficient access credentials to the risk modeler server 190. Alternately, the operator of risk modeler server 190 may provide software to the operator of enterprise network 110 so that the operator of enterprise network 110 may themselves install one or more agents 102 onto nodes of enterprise network 110. For example, local risk model server 192 may be established on Intranet 114 to facilitate the dissemination of one or more agents 102 over Intranet 114 in step 610.

One or more agents 102, as broadly used herein, are software agents that are configured to, among other tasks, monitor nodes of enterprise network 110 for purposes of collecting information used in constructing and refining enterprise risk model 500. The functions performed by one or more agents 102 according to certain embodiments of the invention shall be described in more detail below.

There are two types of nodes, namely habitable nodes and opaque nodes. A habitable node is a node of enterprise network 110 that possesses a computing environment conducive to installation of an agent 102. On the other hand, an opaque node is a node of enterprise network 110 that possesses a computing environment not conducive to installation of an agent 102. For example, a personal computer is an example of a habitable node, because an agent 102 may be installed upon a personal computer without difficulty. An example of an opaque node is an iPhone, as software cannot be installed on an iPhone without the consent of Apple Corporation. Another potential example of an opaque node is a web-enabled security camera which, while being capable of sending and receiving data over enterprise network 110, lacks a sophisticated enough computing environment to facilitate the installation of agent 102.

Certain opaque nodes may expose an application program interface (API) to enable requestors to retrieve information from the node. For example, a network router often supports a Simple Network Management Protocol (SNMP) interface that enables a requestor to query information from the device. An agent 102 of an embodiment may use this SNMP interface to collect information from the network router, even if the agent 102 is not installed on that network router. As another example, an Active Directory Server will often comprise a Lightweight Directory Access Protocol (LDAP) interface that enables a requestor to query information from the Active Directory Server. An agent 102 of an embodiment may use this LDAP interface to collect information from the Active Directory Server, even if the agent 102 is not installed on the Active Directory Server.

Note that certain embodiments may employ a plurality of different types of agents 102. In such an embodiment, there may exist a particular type of agent 102 designed to execute on a particular computing environment which supports only a minimal set of software, such as a web-enabled security camera. In such an embodiment then, the web-enabled security camera may be considered a habitable node for an agent that supports installation thereon.

Embodiments of the invention may employ certain types of agents identified as host agents, traffic agents, and enterprise agents. Host agents collect a very rich, deep set of information about a particular node, but perhaps very little information about the network or enterprise in which that node exists. A traffic agent is a type of agent which collects information about some nodes in the network neighborhood in which the traffic agent is deployed. A traffic agent may gather information about nodes in the network neighborhood at a lessor level of granularity (i.e., fewer details) than a host agent might provide for a particular node. An enterprise agent may collect information about a wide number of nodes across multiple subnets; however, few details about those nodes may be included by the information gathered by an enterprise agent.

An agent 102 may be installed in network proximity (e.g., same subnet and/or same VLAN) as an opaque node. Even though an agent 102 cannot be installed upon an opaque node, an agent 102 may observe and measure network activity going to and from an opaque node; in this manner, agent 102 can generate observation data on opaque nodes. If available, an agent may also obtain using an API exposed by an opaque node to collect information about the opaque node. After one or more agents 102 have been installed on at least one habitable node of enterprise network 110, step 620 may be performed.

In step 620, one or more agents 102 disperse themselves over enterprise network 110. Each agent 102, upon being installed upon a particular habitable node of enterprise network 110, analyzes enterprise network 110 to determine what other adjacent nodes are visible to that agent 102. After identifying what adjacent nodes are visible either agent 102, server 190, or server 192 may install another instance of agent 102 on any visible node which is a habitable node. In an embodiment, one or more agents discover and probe other nodes across Intranet 114 or any other wired or wireless network in enterprise network 110. After one or more agents are executing upon a habitable node, step 630 may be performed.

In step 630, one or more agents 102 generate analysis data that identifies the discovered habitable and opaque nodes of enterprise network 110. Each of one or more agents 102 provides the analysis data it generates to either risk modeler server 190 or local risk modeler server 192. The received analysis data is used by risk modeler server 190 and/or local risk modeler server 192 in the generation and refinement of enterprise risk model 500.

Either on their own initiative, or in response to receiving a request for additional information about the features or characteristics of nodes of enterprise network 110 from risk modeler server 190 or local risk modeler server 192, during their execution while deployed, each of one or more agents 102 may provide analysis data that describes certain information about nodes of enterprise network 110. In an embodiment, such analysis data may describe network observations, device observations, user observations, asset observations, and cloud-storage observations.

Non-limiting, illustrative examples of network observations include information about open ports (such as but not limited to a TCP or UDP port that has been opened by a device to allow other devices to connect to itself or send packet to itself, and deployed network protocols). Network observations described by analysis data in an embodiment may include the identification of any explicit port or implicit port on a habitable node or an opaque node. An explicit port is a port, opened on a node, to enable connections with other nodes over the network. An implicit port is opened by a device to allow the bi-directional flow of packets with another connected device (e.g. while browsing an external website like www.cnn.com).

Non-limiting, illustrative examples of device observations include information about files stored on the node, software (such as operation system, applications including web browsers, and BIOS) versions and installed patches, security protocols under use. Non-limiting, illustrative examples of user observations include information about user privileges and authentication protocols.

In an embodiment, the inherent risk layer model may be represented as a matrix operation on the feature vector depicted in equation 1 below.

$$\begin{bmatrix} \cdots \\ \vdots & M & \vdots \\ \cdots \end{bmatrix} \times [V] = \begin{bmatrix} L_I \\ I_I \\ R_I \end{bmatrix} \quad \text{Equation 1}$$

In equation 1, the model matrix M multiplied by the features matrix V yields the inherent risk vector. In the inherent risk vector, the risk R equals the liability L multiplied by the impact I.

In an embodiment, the dynamic risk layer G may be modeled as a pre-multiplication of the inherent risk layer M to generate a new set of weights, as depicted below in equation 2.

$$\begin{bmatrix} \cdots \\ \vdots & G & \vdots \\ \cdots \end{bmatrix} \times \begin{bmatrix} \cdots \\ \vdots & M & \vdots \\ \cdots \end{bmatrix} \times [V] = \begin{bmatrix} L_G \\ I_G \\ R_G \end{bmatrix} \quad \text{Equation 2}$$

The dynamic risk layer G may change some of the feature weights but not others.

Multi-layer model 500 of an embodiment may also comprise a mitigation layer that models an improvement in risk to enterprise network 110 in response to the performance of potential mitigative actions. In an embodiment, mitigation strategies for reducing risk to enterprise network 110 can also be modeled using a model K also changes the relevant feature weights as depicted below in equation 3.

$$\begin{bmatrix} \cdots \\ \vdots & K & \vdots \\ \cdots \end{bmatrix} \times \begin{bmatrix} \cdots \\ \vdots & G & \vdots \\ \cdots \end{bmatrix} \times \begin{bmatrix} \cdots \\ \vdots & M & \vdots \\ \cdots \end{bmatrix} \times [V] = \begin{bmatrix} L_K \\ I_K \\ R_K \end{bmatrix} \quad \text{Equation 3}$$

Figure 6B:
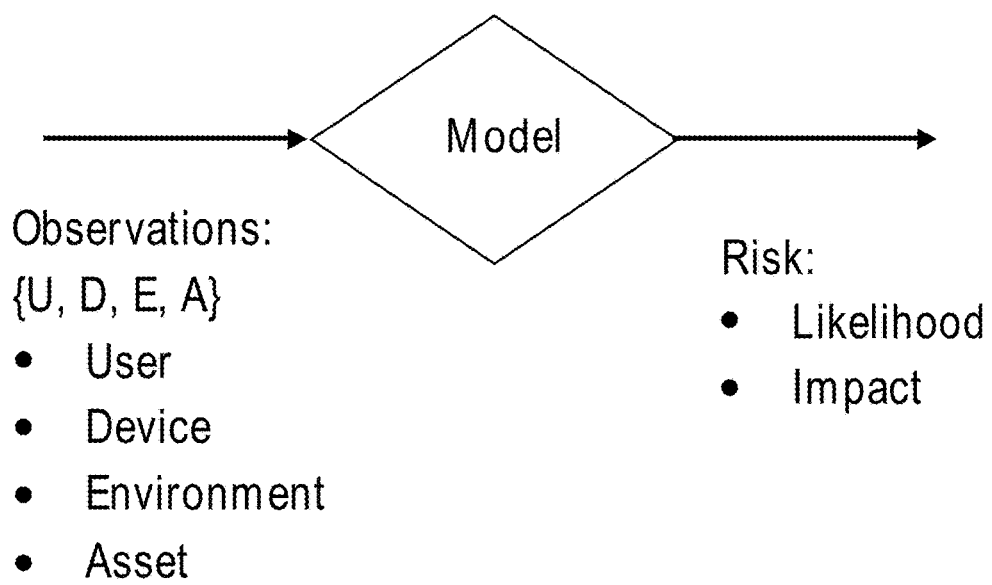
FIG. 6B is an illustration of observations used to model risk to network assets according to an embodiment of the invention.

FIG. 6B is an illustration of observations used to model risk to network assets according to an embodiment of the invention. As depicted in FIG. 6B, analysis data of an embodiment may comprise data that describes for each node: attributes of the user of the node, hardware and software features of the node itself, the environment in which the node is deployed, and the assets stored on the node. Such information will be used by enterprise risk model 500 in assessing the risk of a security breach, and its impact, posed by each node.

Even though an agent 102 cannot be installed upon an opaque node, an agent 102 may observe and measure network activity going to and from an opaque node; in this manner, agent 102 can generate observation data on opaque nodes. If available, an agent may also obtain using an API exposed by an opaque node to collect information about the opaque node. After one or more nodes 102 provide exposure data and observation data to risk modeler server 190, step 640 may be performed.

Returning to FIG. 6A, in step 640, risk modeler server 190 generates enterprise risk model 500 using, at least in part, the analysis obtained in step 630. The inherent risk layer (layer 1 of enterprise risk model 500 depicted in FIG. 2) models an inherent risk presented to the enterprise network based on static features of nodes of enterprise network 110. The inherent risk layer may be generated using the exposure data received in step 630.

Figure 7:
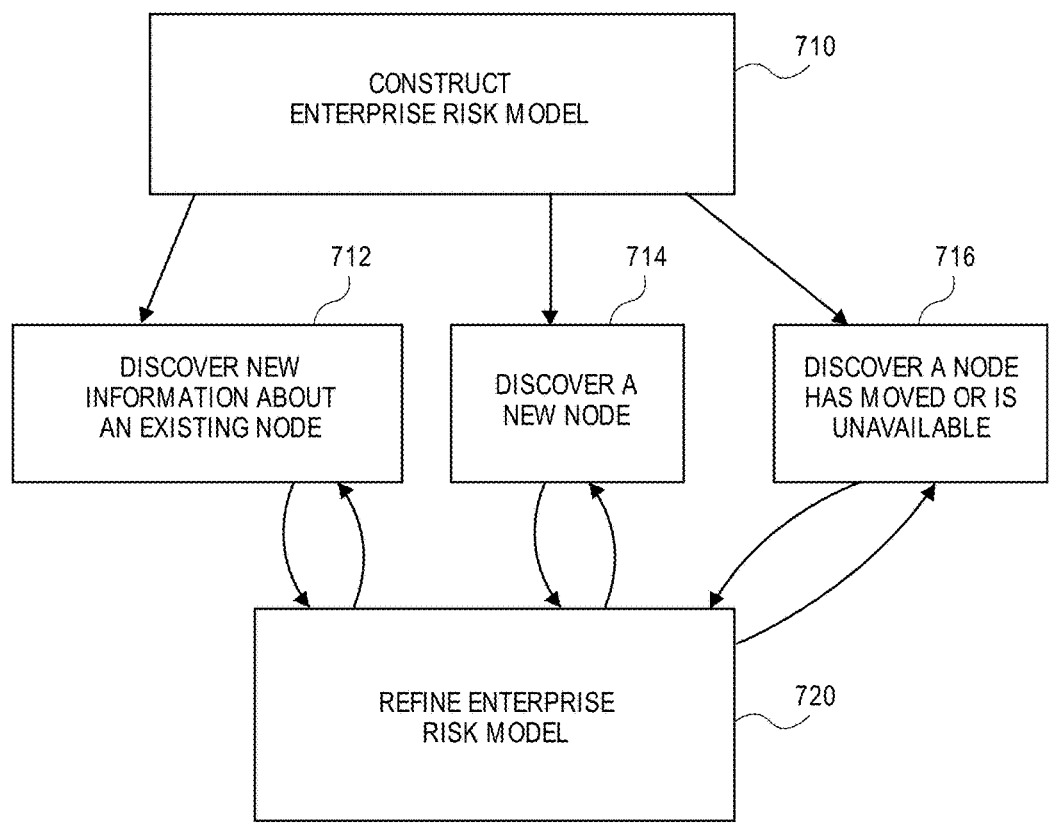
FIG. 7 is a flowchart illustrating the steps of refining the enterprise risk model over time according to an embodiment of the invention.

Analysis data will be received periodically during the deployment of one or more agents 102. Thus, enterprise risk model 500 may be improved and refined over time as information is learned about the nodes of enterprise network 110. To illustrate this principle, consider FIG. 7, which is a flowchart illustrating the steps of refining enterprise risk model 200 over time according to an embodiment of the invention.

In step 710, enterprise risk model 500 is constructed. Enterprise risk model 500 may be embodied vis-à-vis a variety of different forms. After enterprise risk model 500 is constructed, steps 712, 714, 716 may be performed in any order at any time. Thus, there is no implied sequence or order of steps 712, 714, 716.

In step 712, an agent 102 discovers new information about an existing node. For example, such information may include, without limitation, what software (including version numbers, patch installations, and authorized or unauthorized modifications and/or customizations) is installed on the node, what hardware or devices are comprises within or connected to the node, information about the configuration of software installed on the node, information about what processes are executing on the node, information about how a user is using the node, and information about the files, file structure, and digital resources stored on or accessible by the node. In response, agent 102 will generate exposure data that describes the new information about the existing node and transmit the exposure data to the entity responsible for refining enterprise risk model 500, e.g., risk modeler server 190 or local risk modeler server 192.

In step 714, an agent 102 discovers a new node on enterprise network 110. The newly discovered node may be a habitable node or an opaque node. In response, agent 102 will generate exposure data that describes the new information about the new node and transmit the exposure data to the entity responsible for refining enterprise risk model 500, e.g., risk modeler server 190 or local risk modeler server 192. If the newly discovered node is a habitable node, then agent 102 may attempt to deploy another instance of itself or otherwise install a copy of agent 102 on the newly discovered node.

In step 716, an agent 102 discovers a node has been moved or is unavailable. For example, a laptop may be physical disconnected an Ethernet port in an office, thereby leaving Intranet 114, and moved to a conference room where the laptop subsequently reconnects to Intranet 114 using a Wi-Fi connection. An agent 102 installed upon the laptop or located on Intranet 114 may detect that the laptop has moved from being physically connected using a specific Ethernet port to a Wi-Fi connection; this transition may or may not pose a change in the risk of a security breach to enterprise network 110 or the laptop itself.

In step 720, enterprise risk model 500 is refined using the information learned in step 712, 714, or 716. Enterprise risk model 500 may be updated frequently as agents 102 re-probe nodes of enterprise network 110 to glean new information. After enterprise risk model 500 is refined or updated, in an embodiment, if necessary, the one or more agents 102 executing in enterprise network 110 may be updated to reflect the latest version of enterprise risk model 500.

Using the Enterprise Risk Model

Enterprise risk model 500 may be used by embodiments in a variety of different ways to yield many positive benefits. For example, enterprise risk model 500 may be used to programmatically generate an enumeration of all assets within enterprise network 110. The list of assets which may be identified in this fashion include all the habitable nodes and all the opaque nodes of enterprise network 110. Thus, embodiments may be used to ascertain and display in a variety of different formats information identifying all the nodes in enterprise network 110 with scientific precision.

In addition to generating a list of physical hardware, the list of assets may be configured to include information about software installed on nodes of enterprise network 110. Thus, enterprise risk model 500 may be used to identify with scientific precision all software, including information identifying the version number, installed patches, and customizations, and configuration settings, installed on nodes of enterprise network 110, as this information may be methodically collected using one or more agents 102.

Further, certain embodiments may be used to programmatically generate an enumeration of all the digital assets stored on each node of enterprise network 110. For example, if an administrator wishes to identify which nodes of enterprise network 110 store sensitive financial data, enterprise risk model 200 could be used to determine the nodes storing such content.

Further, certain embodiments may be used to programmatically identify whether any nodes of enterprise network 110 are presently compromised through observation conducted by one or more agents 102.

Embodiments of the invention may also produce what is known as a risk inventory, which is an ordered list of the inherent risks of malicious attack to the resources of the network. For example, upon request, embodiments may generate a list of top X risks ("top risks list") to enterprise network 110, where X is a configurable number. For example, if X is set to 3, the list produced might appear as:
1. Presence of secure data files on node 124
2. Unprotected WiFi network
3. Ongoing Heartbleed attacks.

The risk inventory may be filtered using a variety of different criteria. For example, the risk inventory may be generated for the enterprise or filtered based on one or more factors, such as but not limited to: a particular geographical region (such as country or state), an organizational unit (such as marketing or engineering), and a device type (such as cell phones, laptops, or PCs). Indeed, the risk inventory may be generated for a specific node or for a set a nodes associated with a specific user.

Embodiments may display information about the risk inventory to enterprise network 110 on a user interface. When a particular attack vector or risk is selected, the user interface may be updated to display additional and more granular information about the selected attack vector or risk.

In an embodiment, embodiments may display information about the risk inventory on a heat map (a risk heat map). The risk heat map may be superimposed over, or take the form of, other meaningful graphical illustrations to impart the source of risks to network enterprise 110 in an intuitive manner. For example, the risk heat map may take the form of an organizational chart, an asset diagram, a geographical map, a network diagram, or graphical illustrations of various software applications.

Figure 8A:
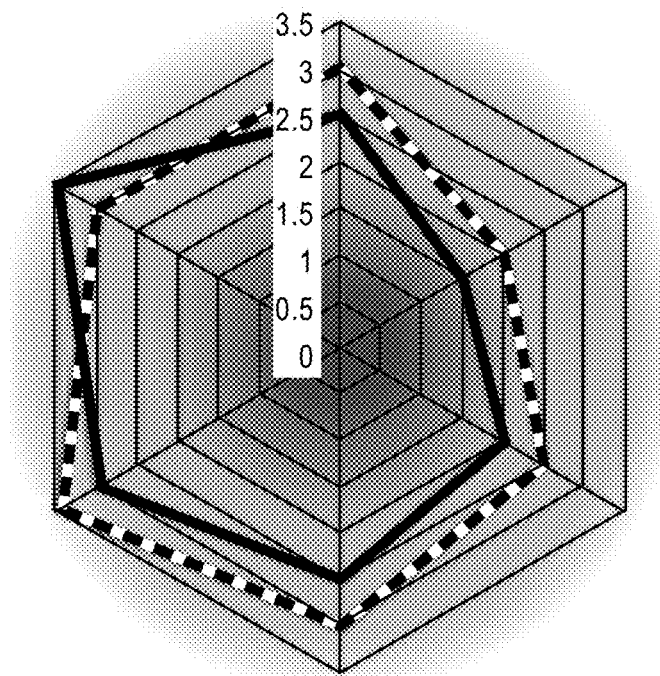
FIGS. 8A and 8B are graphical illustrations of a risk heat map according to various embodiments of the invention.
Figure 8B:
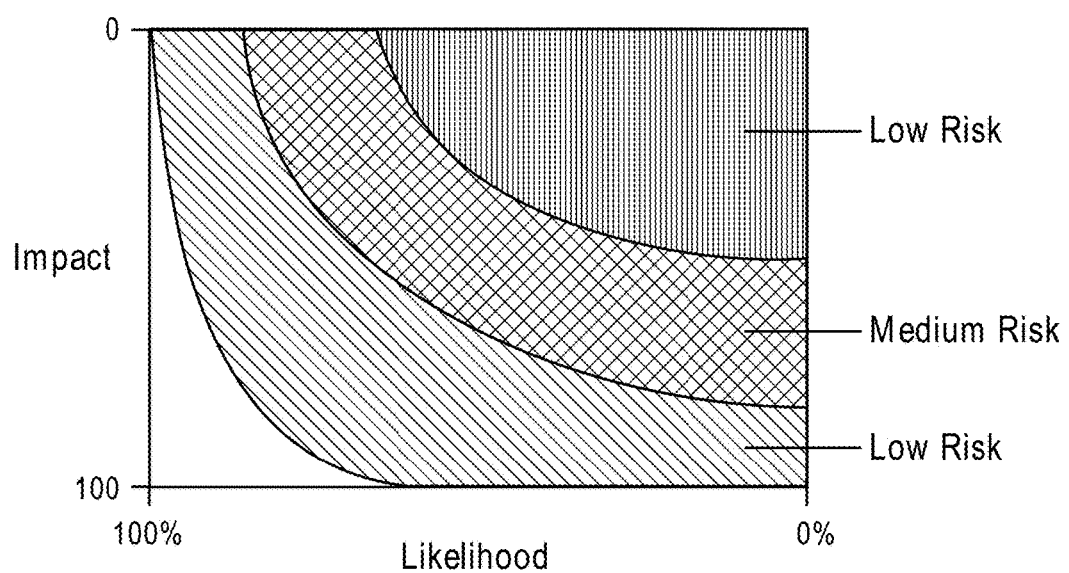

FIGS. 8A-8B are graphical illustrations of a risk heat map according to various embodiments of the invention. The example of FIG. 8A depicts the risk associated with two groups of 6 devices (one group is depicted using a solid line and the other group is depicted using a hatched line) on a scale of 0 to 3.5. The risk score of each device is plotted on the radial axis and the combined polygon shows the overall risk of the group of devices.

In the example FIG. 8B, the graph starts at the top right corner. The x-axis is the risk in one dimension (e.g., likelihood) while the y-axis is the risk in another dimension (e.g., impact). The curved boundaries in the graph of FIG. 8B depict the differentiation between a mix of likelihood and impact that shows low-medium-high overall risk. As depicted in FIG. 8B, low likelihood and low impact corresponds to low risk (top right) while high likelihood and high impact correspond to the high risk region (bottom left). Note that FIGS. 8A and 8B are two examples of the countless arrangements of risk heat maps which may be employed by embodiments of the invention.

In an embodiment, a risk heat map may be dynamically created to identify how an adversary is likely to breach the security of network enterprise 110 for every category of assets and/or nodes of network enterprise 110.

Identifying the Best Way to Improve Security

To illustrate a simplified example illustrating how enterprise risk model 500 may be employed by an embodiment, assume that a first computer in data center 1 depicted in FIG. 1 is a human resource server storing sensitive employee information. Given the importance of the information stored on that node, the node is assigned an impact score I of 10. Other node 130 is a desktop PC which is sparingly used and stores no important information; consequently, that node is assigned an impact score I of 1. Thus, the information stored in the human resources server is deemed to be 10 times more important than the information stored on the desktop PC 130.

The human resource server is well-guarded, not exposed to public network 180, and only has two ports open. Further, there are rules administered and enforced by a firewall as to who may access the two open ports of the human resource server. As a result of these precautions, the human resources server is assigned a likelihood L score of 1. As risk R is calculated as the product of Impact I and likelihood L, the risk value of the human resources server is calculated as 10.

The desktop PC occasionally performs web browsing to certain web sites on a white list. Since the desktop PC performs some amount of web-browsing, a likelihood L score of 5 is assigned to this node, even though the web browsing is performed using procedures designed to mitigate risk. The value of risk R in this case is the product of Impact I (1) and likelihood L (5), which yields a value of 5.

By comparing the relative risk values of 10 for the human resources server and 5 for the desktop PC which browses the Internet, an administer or other personal responsible for ensuring the safety of enterprise network 110 can arrive at the decision that money is better spent protecting the human resources server rather than the desktop PC, even though the human resources server is already better guarded.

Logical Architecture of an Embodiment

Figure 9:
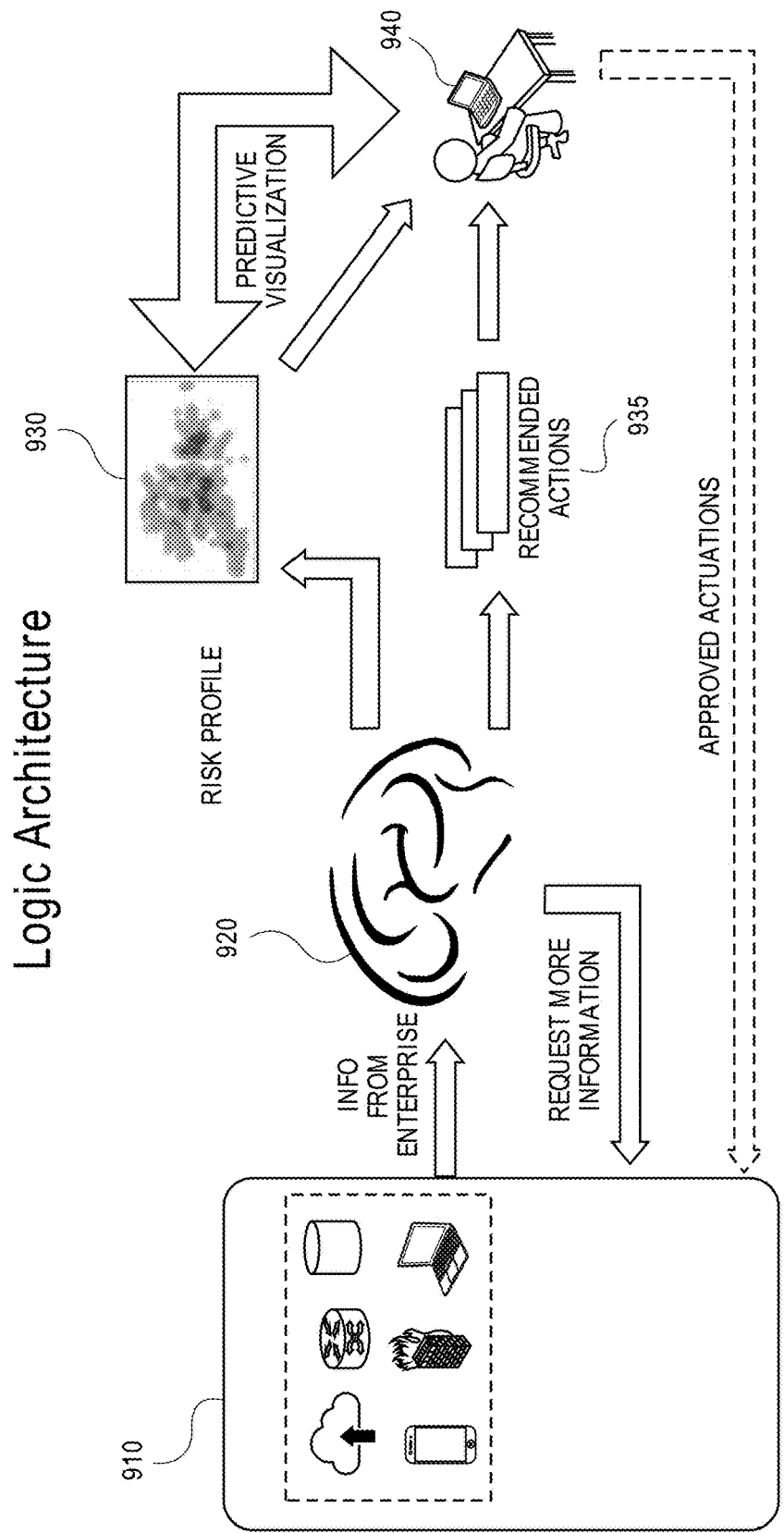
FIG. 9 is an illustration of the logical architecture for identifying and mitigating risk to the enterprise network according to an embodiment of the invention.

FIG. 9 is an illustration of the logical architecture for identifying and mitigating risk of security breach to enterprise network 110 according to an embodiment of the invention. As shown in FIG. 9, agents 910 collect analysis data from nodes of the enterprise network and transmit the analysis data to enterprise risk model 920, which may be maintained at risk modeler server 190 or local risk modeler server 192.

A user 940, such as an IT administrator or network operator, may interact with enterprise risk model 920 to obtain information about the risk of security breach to the enterprise network. Such information may be presented in a variety of formats and filtered using a variety of factors. For example, such information may be visually depicted on a risk heat map 930 or as a list of risks ordered in a particular manner. Enterprise risk model 920 may suggest recommended actions 935 to user 940, which when performed, reduce the risk of security breach to specific nodes of enterprise risk 110. In this way, user 940 may be informed of the recommended actions to undertake to cause the risk of a security breach to enterprise network 110 to be reduced to or below an acceptable level of risk.

When a user approves a course of action suggested by enterprise risk model 920, and applies them to the network, agents 910 will automatically detect any changes made to the enterprise network, and the risk of security breach to the enterprise network as modeled and presented by enterprise risk model 920 will be updated accordingly. As agents 910 communicate with a server upon which enterprise network model 920 resides, agents 910 may respond to specific requests for updated information from the server about the one or more nodes affected by any change made by user 940 of which enterprise network model 920 is informed. In this way, analysis data may be obtained to reflect the current state of the enterprise network to present an accurate picture to user 940.

Advantageously, enterprise network model 920 enables user 940 to be informed of the highest value assets in the enterprise network, particularly in the core. Enterprise network model 920 may use analysis data collected by agents 910 to identify, for each node in the core of the enterprise network, a path from the perimeter of the network to each node in the core of the network having the highest likelihood of a security breach, irrespective of how many hops are in the path. For each asset, a path of least resistance from the perimeter of the network to the asset may be identified. This path of least resistance corresponds to a highest likelihood of a security breach irrespective of how many hops are in the path. In this way, embodiments of the invention may be used to programmatically generate an ordered list of potential mitigative actions to reduce or mitigate impact to the risk of security breaches to the assets of the network.

Figure 10:
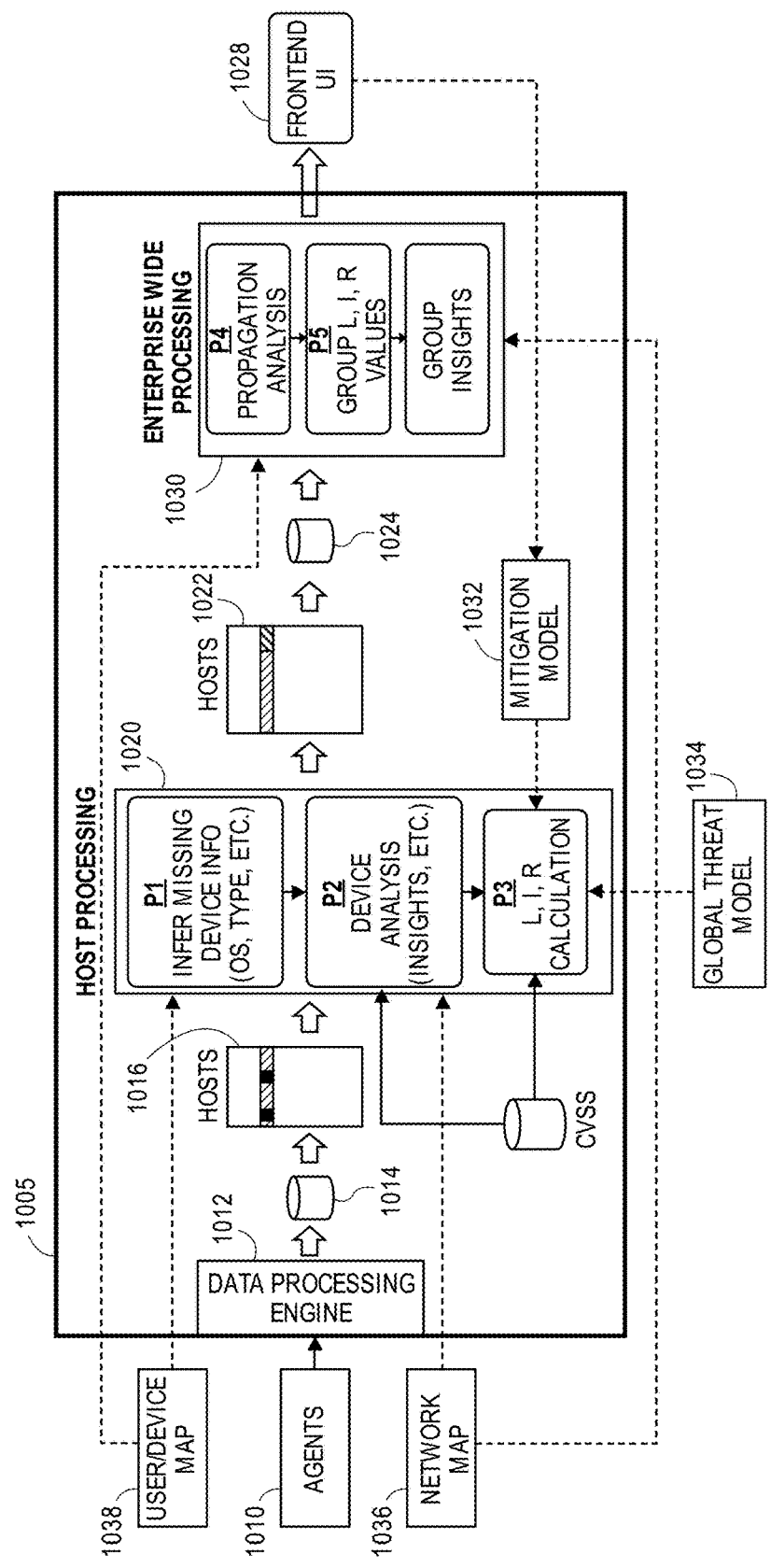
FIG. 10 is a block diagram of a system-wide architecture according to an embodiment of the invention.

FIG. 10 is a block diagram of a system-wide architecture according to an embodiment of the invention. Agents 1010 collect analysis data and send the analysis data over a network to data processing engine 1012. Data processing engine 1012 may correspond to or include risk modeler server 190 or 192, but need not limited to risk modeler server 190 or 192. For example, data processing engine 1012 may perform a certain amount of data processing before handing off the processed data to risk modeler server 190 or 192. The analysis data received and processed by data processing engine 1012 is stored in one or more tables 1016 in one or more databases 1014.

One or more tables 1016 store information about each node (or host) that has been gathered by agents 1010, but the information gathered by agents 1010 may be incomplete. Certain information about each node may be known (visually represented by the diagonal pattern in the row depicted in one or more tables 1016), while other information about a node may not yet be known or discovered (visually represented by the black gaps in the row depicted in one or more tables 1016).

The information that is stored in one or more tables 1016 about nodes (or hosts) in the system are read by host processing component 1020. Component P1 of host processing component 1020 processes the data to attempt to infer missing information. For example, if the data stored in one or more tables 1016 does not identify a device type of a node or the operating system executing on a node, that missing information is attempted to be ascertained from other sources, such as user/device map 1038. User/device map 1038 represents any source, such as a domain controller or Active Directory server, which is a well-known component that manages user names, IP addresses, and the like. Component P1 may also identify, using the information stored in one or more tables 1016, for nodes on enterprise network 110, certain categories, such as a device type category and an operating system category, based on a machine learning model. Additionally, component P1 may attempt to categorize the role played by each node of enterprise network 110 based on the information stored in one or more tables 1016.

After component P1 fills in missing information to the best of its ability, component P2 of host processing component 1020 further processes the analysis data to identify any applicable Insights. Insights, as used herein, refer to expert knowledge pertinent to the analysis data processed by host processing component 1020. Insights may be used to augment the analysis data and used as input into the machine learning model employed by embodiments. For example, an Insight might indicate that a protocol, being used by a particular printer, is an older protocol that is susceptible to compromise. In this way, an Insight is a statement about a particular node that indicates that the node is at risk. Insights are actionable in that the Insight also identifies the remedy needed to be effected to address the risk presented by the insight. In the earlier example involving the older printer protocol, the Insight might identify that the protocol should be updated by performed one or more concrete steps. In an embodiment, network map 1036 may provide information to component P2 to assist in the determination of any Insights.

Thereafter, component P3 considers the analysis data gathered by component P1 and any Insights gathered by component P2 and performs a risk calculation posed to each node. In an embodiment, global threat model 1034, which corresponds to Layer 2 of the enterprise risk model discussed above, may also act as an input to component P3. In an embodiment, mitigation model 1032, which corresponds to Layer 3 of the enterprise risk model discussed above, may also act as an input to component P3.

Components P2 and P3 may each consider data obtained from a publicly accessible source such as but not limited to CVSS, which is a common vulnerability scoring system that is owned and managed by FIRST.Org, Inc. (FIRST), a US-based non-profit organization. As is well-known in the art, CVSS is a global database that stores information about known cyber threats.

Data produced as a result of processing performed by host processing component 1020 is stored in one or more tables 1022 in one or more databases 1024. The data stored in one or more tables 1022 corresponds to analysis data, augmented as best possible with any missing information by component P1, in combination with information about the risk posed by each node.

Data stored in one or more databases 1024 is read by enterprise wide processing component 1030. Enterprise wide processing component 1030 examines all nodes across the system and performs a series of cross-node operations. Component P4 analyzes how attacks may propagate from one node to another. Component P5 computes the risk across the entire enterprise and gather Insights for the enterprise. Enterprise wide processing component 1030 may display the results of any processing on Front End UI 1028. As but a few examples, Front End UI 1028 may be instructed to display raw data or a visual representation (such as a pie chart) of the number of nodes in each type of device type category in enterprise network 110. The visual representation may represent the relative number of nodes in each device type category by its size and/or may visually represent the likelihood of a security breach posed by nodes using color.

Many further approaches for carrying out the above processes will be discussed in further detail below.

Segmenting the Enterprise Network

A medieval castle most visibly offers protection vis-à-vis strong outer walls. If the outer walls of a medieval castle are breached, the castle contains internal walls which are designed to slow, impede, and stop anyone who breaches the outer walls. Computer networks are, as a general rule, not designed like a medieval castle. By analogy, once the strong outer walls of a typical computer network are breached (i.e., a malicious attack successfully gains access to a computer located on the computer network), there is very little internal security on the computer network. This is so because computer networks are generally designed for ease of use and security is an afterthought. Consequently, it is common for prior approaches to offer no protection whatsoever in zone of propagation 250 depicted in FIG. 2. In other words, once perimeter 230 is breached, there often is very little resistance or barriers between perimeter 230 and core 210, thereby making a subsequent breach of core 210 very likely once perimeter 230 has been circumvented or overcome.

Embodiments of the invention are designed to, in the parlance of the above analogy, provide inner castle walls by enhancing the security of any node-to-node activity on enterprise network 110. Embodiments of the invention programmatically determine, using enterprise risk model 500, a plurality of restrictive subnetworks in which enterprise network 110 is to be divided. Thus, each of the plurality of restrictive subnetworks is to include one or more nodes of enterprise network.

Restrictive subnetworks may, but need not in every embodiment, overlap. As a result, a single node may be a member of a single restrictive subnetwork or a member of two or more restrictive subnetworks.

The composition of a restrictive subnetwork may be based on an organizational chart, e.g., a first restrictive subnetwork may include all engineering nodes while another restrictive subnetwork includes all human resources nodes. Alternately, the composition of a restrictive subnetwork may be determined based on device type, geography, stored assets, randomly, a type of application or class of software, or a group of people. In an embodiment, risk modeler server 190 or local risk modeler server 192 can determine, with consultation with enterprise risk model 500, the composition of the plurality of restrictive subnetwork using any criteria to arranging nodes of the network into groups.

Using restrictive subnetworks, the impact of security incidents may be mitigated. Each restrictive subnetwork requires a special credential or key to gain access. Each of one or more agents 102 is informed of the one or more restrictive subnetworks to which the agent 102 belongs. Each agent 102 therefore can enforce segmentation constraints on enterprise network 110 by requiring any process or software entity to possess the necessary credential or key associated with any restrictive subnetworks to which the agent 102 belongs when requesting access to the node or an asset stored thereon.

It is contemplated that a node may need to traverse two or more restrictive subnetworks in order to access certain assets of enterprise network 110; in an embodiment, the node desirable of that asset would not only need to possess the credential or key associated with the restrictive subnetwork to which the asset belongs, but also need the credentials to any restrictive subnetwork which needs to be traversed between the requesting node and the asset.

Note that agents 102 in each restrictive subnetwork are only informed of the credential or key for the restrictive subnetworks in which they reside. Thus, if a malicious attack were to successfully gain access to any one restrictive subnetwork of enterprise network 110 (e.g. Client Device Network 2), the compromised node with lack the credentials or keys necessary to gain access outside of its restrictive subnetwork (e.g. to Data Center 1).

In an embodiment, one or more agents 102 enforce the security constraints imposed by the plurality of restrictive subnetworks at the network level. As a result, the security constraints can be enforced against opaque nodes as well as habitable nodes. Moreover, enforcing the security constraints imposed by the plurality of restrictive subnetworks at the network level results in the security constraints being difficult to circumvent as they are implemented at a low level of operation. In an embodiment, one or more agents 102 also enforce the security constraints imposed by the plurality of restrictive subnetworks at the user level or application layer.

Embodiments may enforce the security constraints imposed by the plurality of restrictive subnetworks at the network layer (i.e., the third layer of the well-known OSI model), the application layer (i.e., the seventh layer of the well-known OSI model), and/or the credential layer (i.e., the layer or point in execution flow at which credentials are verified before granting access to assets). According to embodiments, a device can reach an asset via the routing layer, but would not be permitted to access the asset without the correct credentials.

Using Observations in Construction of Enterprise Risk Model

Figure 11:
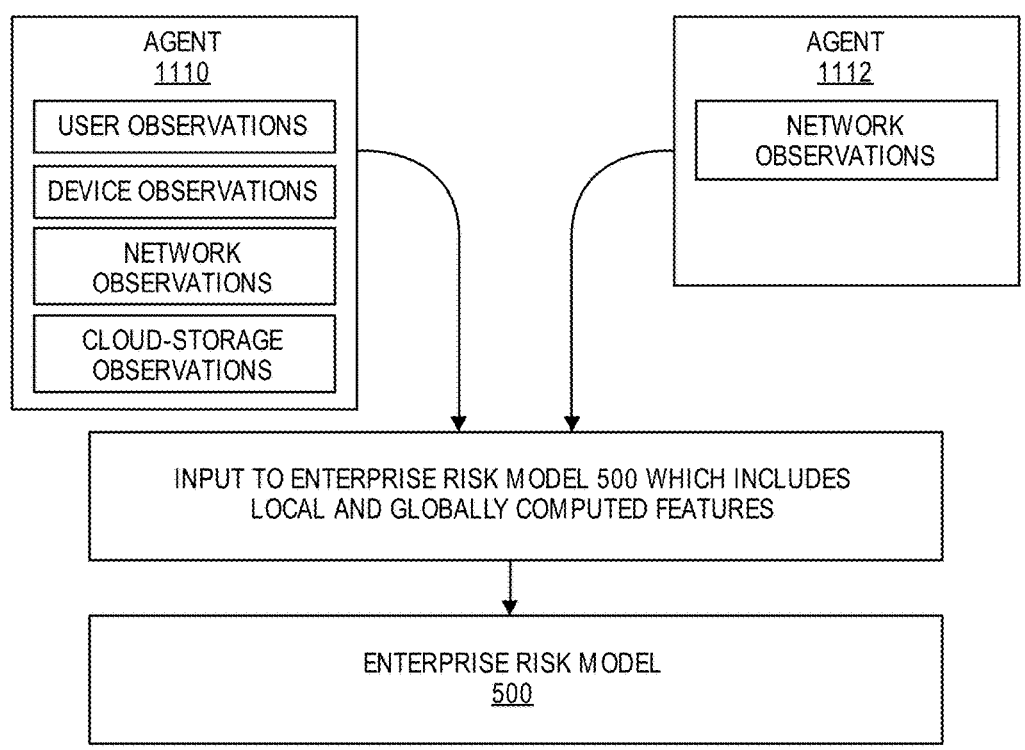
FIG. 11 is a block diagram illustrating an approach for using identified features of nodes of a network in the construction of an enterprise risk model according to an embodiment of the invention.

FIG. 11 is a block diagram illustrating an approach for using identified features of nodes on network 110 in the construction of enterprise risk model 500 according to an embodiment of the invention. FIG. 11 depicts agent 1110 and 1112, which are specific examples of agent 102 shown in FIG. 1.

Embodiments of the invention employ agents 102 to make observations about nodes of network 110. Such observations may be made on a wide array of topics, as observations may correspond to any characteristic of a node of network 110 observable by an agent. Agents 102 may make an observation about a particular node while executing either on that node or on a different node which is in the same vicinity on network as the node being observed. Characteristics of a node which may be observed by an agent 102 include specific observations following under the categories of network observations, device observations, user observations, asset observations, and cloud-storage observations, to name but a few examples. An agent 102 may make certain types of observations about a node without making other types of observations, e.g., relative to the node upon which agent 1110 executes, agent 1112 may make network observations and/or no observations at all.

The observations made by agents 102 are used to generate features. A feature refers to processed information based on observations. A feature may be embodied by a numeric vector representation of characteristics of a node. Features may be expressed in a variety of different formats. For example, a feature may be expressed as a relatively small and dense numeric vector representation to represent a certain observation pertaining to a node's handling of or configuration regarding the TCP/IP protocol. As another example, a feature might be expressed using a longer and sparser numeric vector representation to represent a certain observed behavior characteristic.

A feature can have a many-to-many relationship with an observation. For example, a single observation may contribute to multiple features, while a single feature may be determined based upon multiple observations, and potentially even observations made about multiple nodes. A feature may be static (i.e., not changing over time) or dynamic (changing as new observations are made). The enumeration of all possible features may be defined and developed over time, at least in part, upon expert opinion and informed consideration.

Features may be determined either at the node being described by the feature locally (for example, by an agent executing upon a node having the feature) or off the node being described by the feature (for example, at another node or a remote server, such as risk modeler server 190). In an embodiment, the features created using observations made by agents 102 comprise (a) local features computed locally at one or more habitable nodes, (b) local features computed by an agent in the local vicinity on the network of one or more opaque nodes, and (c) remote features computed external to the node.

Enterprise risk model 500 may be generated and continuously refined, using machine learning techniques, based upon the determined features of nodes of network 110. The features, as they are determined and become available, are provided as input to the machine learning engine so enterprise risk model 500 always reflects the most current and complete knowledge set available with respect to observations made by agents 102 deployed across network 110.

In an embodiment, enterprise risk model 500 may be constructed at risk modeler server 190. Thereafter, enterprise risk model 500 may be deployed at multiple networks, such as for example network 110. Upon deployment, a separate local copy of enterprise risk model 500 may be stored and maintained at each network, e.g., a separate local copy of enterprise risk model 500 may be stored at local risk model server 192. After deployment, each locally stored copy of enterprise risk model 500 may evolve separately and automatically, in its own way incrementally over time to model the unique risks associated with the network in which it is deployed.

Figure 12:
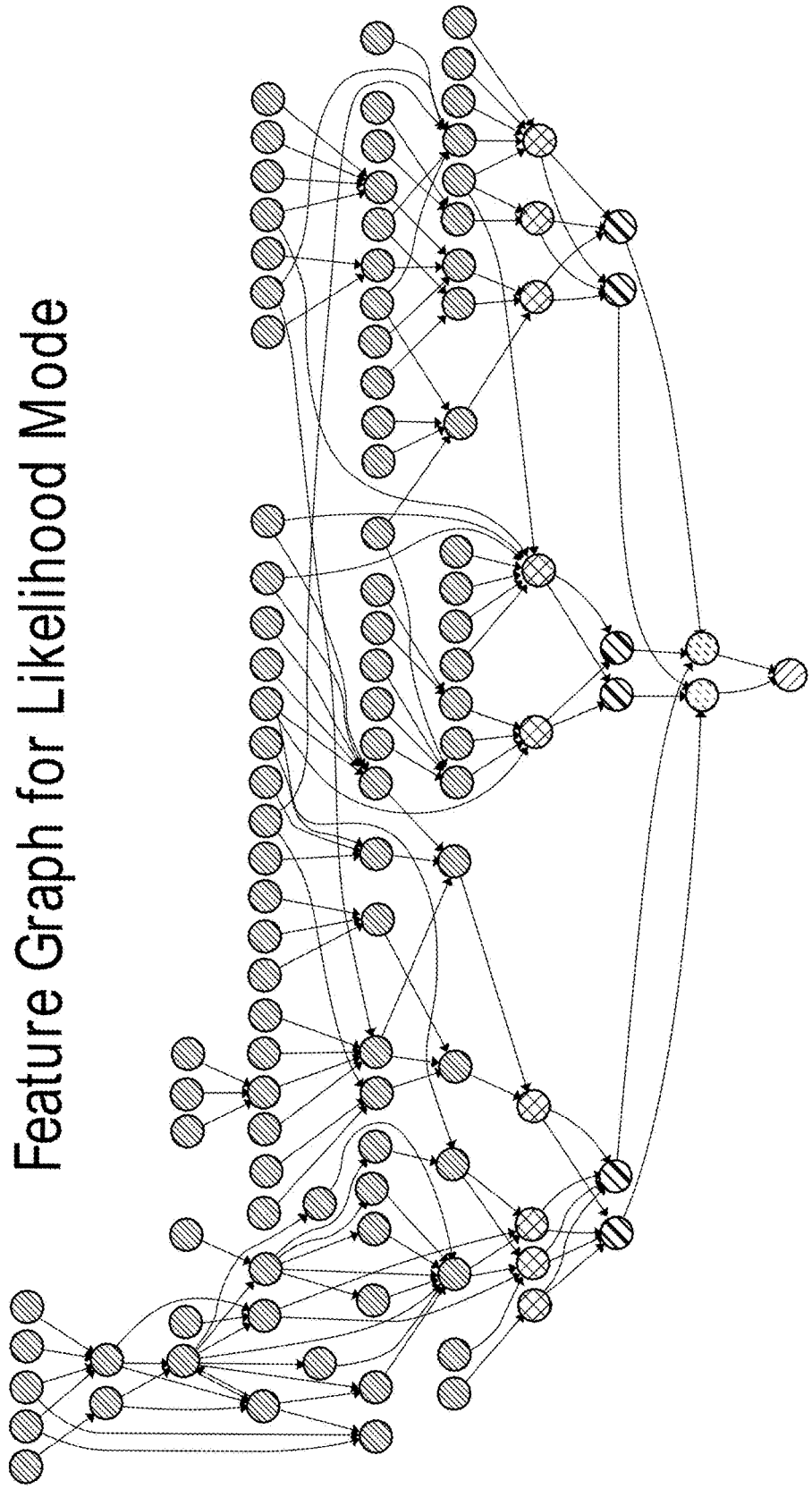
FIG. 12 is an exemplary feature model according to an embodiment of the invention.

FIG. 12 is an exemplary feature model according to an embodiment of the invention. Each node of FIG. 12 represents a different feature. As depicted by the exemplary feature model of FIG. 12, one or more lower level features may be represented by a higher level feature. The relationships between features for each node of enterprise network 110 may be represented and modeled using a feature mode such as that depicted by FIG. 12.

Node Modeling

FIG. 13 is a table depicting feature vectors according to an embodiment of the invention. FIG. 13 is meant to depict certain principles which may be deployed in accordance with more complicated data sets; consequently, feature vectors employed by other embodiments may comprise or reflect more complex data sets than those depicted by the example of FIG. 13.

The columns of the table of FIG. 13 depict various attributes of exemplary feature vectors. In the example of FIG. 13, the column labeled 'company type' indicates a portion or division of an organization with which a particular node is associated. For example, feature vectors 1310, 1320, and 1330 are associated with an engineering or technical division while feature vectors 1340, 1350, and 1360 are associated with a legal department or division.

The column labeled 'device type indicates the device type of the node associated with the feature vector. For example, feature vectors 1310, 1340, and 1360 are associated with laptop computers, feature vector 1320 is associated with a desktop computer, and feature vectors 1330 and 1350 are associated with a server.

The columns labeled 'file type,' 'num files,' and 'file source' store information pertaining to files stored on a node associated with the feature vector. For example, feature vector 1310 identifies that the node associated with that feature vector stores 233 files of file type PDF which originated from the user of that node. As another example, feature vector 1320 identifies that the node associated with that feature vector stores 20 files of file type JPEG which originated from the Internet. As one more example, feature vector 1330 identifies that the node associated with that feature vector stores 7500 executable files which are part of the installed operating system.

The table of FIG. 13 also includes a column labeled 'impact.' The impact column stores an impact value that identifies a relative measure of the significance or importance of the assets associated with the feature vector. Thus, the greater the importance of the files associated with a feature vector, the greater the associated impact value. An impact value may be used as way to determine which assets, or files, in an organization are most valuable, and by extension, most worthy of being protected against malicious attacks.

An impact value may be assigned by an expert to an initial set of feature vectors. For example, an expert or an informed and experienced user may assign impact values to feature vectors 1310, 1320, 1330, 1340, 1350, and 1360. Thereafter, machine learning techniques may be used to programmatically generate a suggested impact value to new feature vectors subsequently added to the corpus of feature vectors. Suggested impact values may be approved, and subsequently assigned, by an administrator or other appropriate user.

To illustrate, assume that at some point in time after the creation of feature vectors 1310-1360, new feature vector 1370 is created. After creation, an impact value will need to be assigned to feature vector 1370. While a human is responsible for approving the impact value of feature vector 1370, machine learning techniques may be used to suggest an impact value based on a comparison of previous impact values assigned. In this example, the characteristics of the files associated with feature vector 1370 are similar to those of feature vector 1340; as feature vector 1370 identifies slightly more files than that of feature vector 1340, machine learning technique may suggest that feature vector 1370 should be assigned with an impact value slightly greater than that of feature vector 1340. Once the suggested impact value is approved by an appropriate person, the impact value will be assigned to feature vector 1370.

As another example, feature vector 1380 may be deemed similar to feature vectors 1340 and 1350 as these vectors are associated with files originating from an installed operating system. Files originating from standard or commodity installed software packages may be deemed to possess relatively minor value or importance relative to files comprising trade secrets, financial information, or other information not known or publically available. Consequently, machine learning technique may suggest that feature vector 1380 should be assigned a relatively low impact value similar to feature vectors 1340 and 1350, but at a slightly reduced value given the smaller number of files involved compared to feature vectors 1340 and 1350.

Machine learning techniques may also be used to detect and flag anomalous impact values assigned by a user. For example, a user has assigned an impact value of 5 to feature vector 1390. An impact value of 5 is considered anomalous based on a comparison of impact values previously assigned to feature vectors with similar characteristics. Consequently, the impact value for feature vector 1390 may be brought to the attention of an administrator or other user to verify the correctness of this impact value.

Computing Risk Across Different Dimensions

There are many different reasons why a particular node might be more secure or less secure than another node. For example, the strength of a password used to access the node, the caliber of a firewall protecting the node, and the proficiency of the malware detection software executing on the node all play a part in the security of a node. In constructing enterprise risk model 500 at risk modeler server 190, it may be necessary to make judgements about how secure a particular node is against the possibility of a security breach, which requires considering a multitude of disparate factors.

To assess an overall measure of risk across many different dimensions, a comparison is made, for each dimension, of how the characteristics of a particular node measure up against a larger set of nodes, e.g., the characteristics of a single node might be compared against all other nodes in network 110 or against a broader set of nodes for a multitude of networks, which may or may not include network 110.

Figure 14:
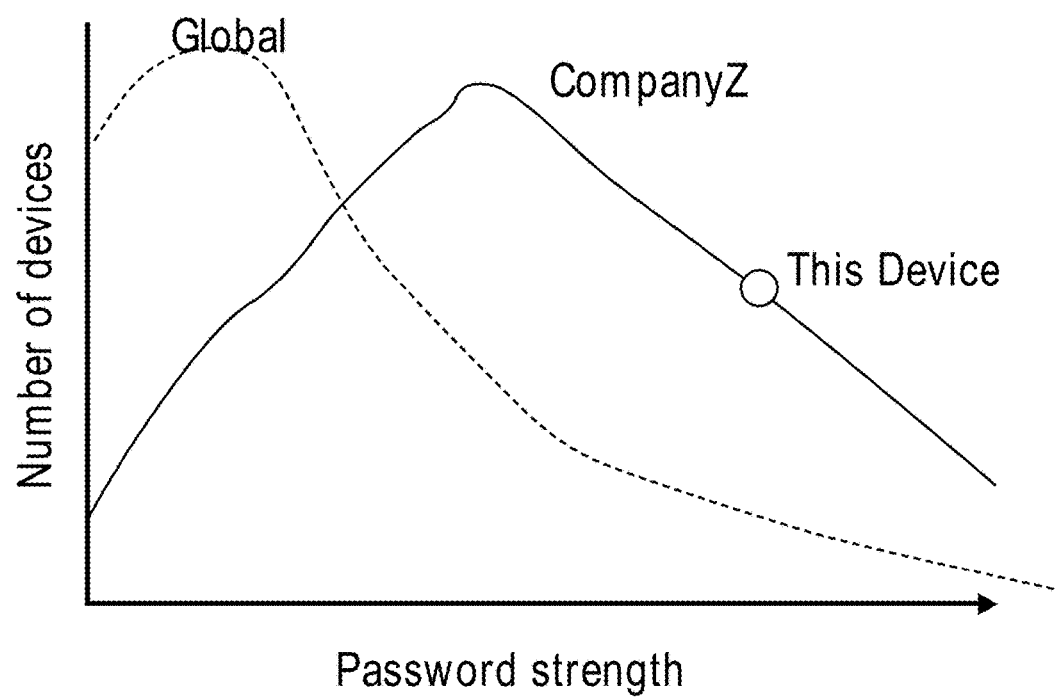
FIG. 14 is a graph depicting a distribution of an amount of devices employing passwords of different strengths as considered by embodiments of the invention.

To illustrate, consider FIG. 14, which is a graph depicting a distribution of devices employing passwords of different strengths across both a fictitious company named CompanyZ and a global distribution as considered by embodiments of the invention. For purposes of this example, assume that network 110 is operated by CompanyZ. Information about the password strength of passwords employed by nodes of network 110 may be collected by agents 102. Information about the password strength of passwords employed by nodes outside of network 110 may be collected by risk modeler server 190 or otherwise publically available vis-à-vis published reports.

FIG. 14 depicts how a particular node's password strength compares against the password strength of other nodes of network 110 as well as a global distribution of password strengths. Based on this information, it is possible to determine the statistical distance of a particular node's password strength is from the mean of password strengths for CompanyZ and the world at large. Statistical distance may be determined based on distance from the mean divided by the variance. After computing the statistical distance from the mean for each dimension, an overall measure of risk of security breach for a particular node may be computed by determining a joint probability function from distance away from the mean for all dimensions represents the disparate features of the node.

Feature Nodes and Insights

Figure 15:
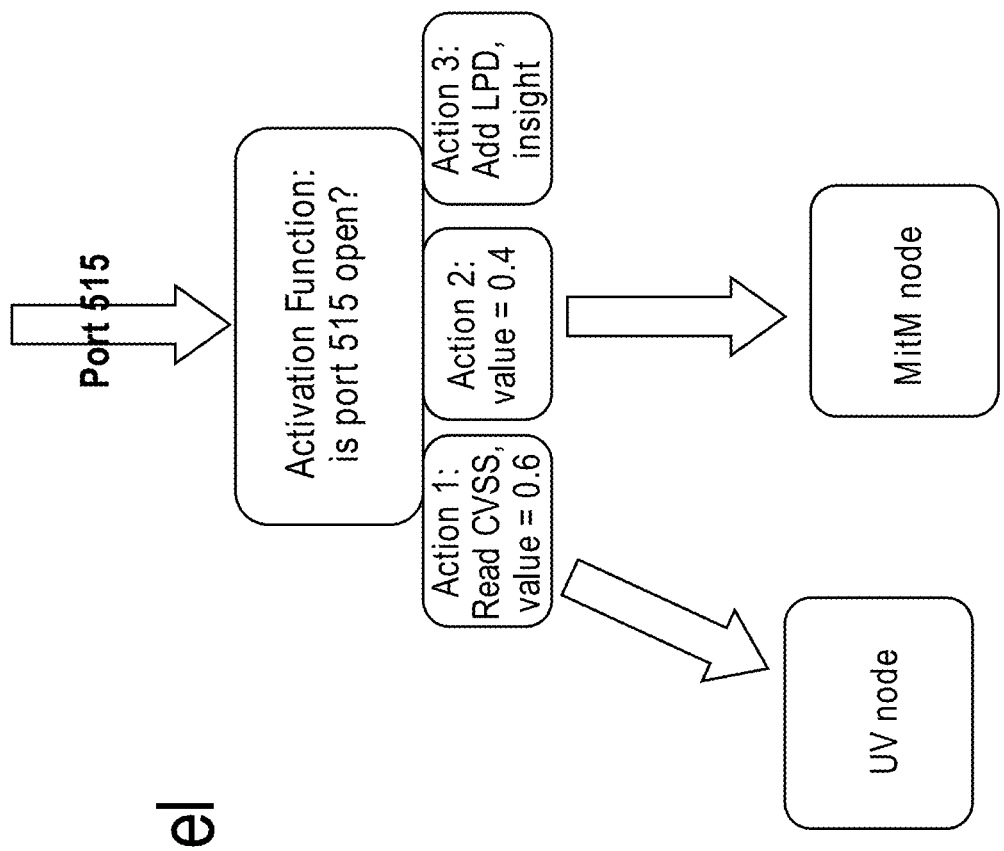
FIG. 15 is an illustration of the interaction between features in a feature model according to an embodiment of the invention.

FIG. 15 is an illustration of the interaction between features in a feature model according to an embodiment of the invention. The feature node of FIG. 15 corresponds to a node of the feature node model depicted by FIG. 12 in an embodiment. Each feature node, as taught by FIG. 15, may comprise a set of input edges, an activation function, a set of actions, and a set of output edges. The components of a feature node depicted in FIG. 15 enable the feature model of FIG. 12 to calculate a value representing the risk presented by the set of features being modeled.

To illustrate, assume that an input edge to the feature node of FIG. 15 identifies port 515 on a particular node. In response, an activation function is performed to determine whether port 515 is open on that node. If port 515 is not open, then the activation function determines that no further action need be taken. However, if the activation function determines that port 515 is open at the node, the activation function creates a set of actions. In performing each action of the set of actions, an output edge to another node may be created. That output edge thus becomes an input edge to another node, which repeats the process using its own activation function.

One example action is the addition of a particular Insight. As explained above, Insights are attributes of a feature and are typically crafted by experts. Insights may be used as input into the machine learning model employed by embodiments. Insights may aid the understanding of the risks presented to network 110, as Insights offer a window in the risks associated with different methods of breaching network security, as shall be illustrated in further detail below.

After enterprise risk model 500 has been constructed, enterprise risk model 500 may be queried to identify risks from a plurality of perspectives. Consider FIG. 16, which is an illustration of several exemplary types of Insights and a set of actionable risk drivers according to embodiments of the invention. Enterprise risk model 500 may be queried to display on Front End UI 1028 a set of Insights associated with network 110. Three such Insights are shown in FIG. 16, namely configuration vulnerabilities, software vulnerabilities, and behavioral vulnerabilities.

The first Insight depicted is configuration vulnerabilities, which corresponds to a configuration on a node which is deemed too risky. Each Insight comprises a risk driver, which may correspond to one of the risk categories previously discussed with respect to FIG. 4A. Risk drivers are typically expressed using natural language so that the risks may be understood by those without a technical background. The example configuration vulnerability Insight in FIG. 16 is associated with a Man-in-the-Middle risk driver. FIG. 16 also depicts certain details behind this risk driver. Alternatively or additionally, the details and supporting evidence behind a risk driver may be presented simply by clicking on the displayed risk driver, which initiates the retrieval (from enterprise risk model 500) and display of more fine-grained and detailed information. The fine-grained information supporting a risk driver corresponds to, or is derived from, enterprise risk model 500 and the feature vectors upon which it is constructed. FIG. 16 also shown such additional information may be provided to a certain extent under the field of Observations.

FIG. 16 also shows also exemplary Insights which may be displayed on Front End UI 1028. The software vulnerabilities Insight refers to outdated or vulnerable software executing on a node, while a behavioral vulnerabilities Insight refers to risky behavior performed using a node. Each of these Insights also is associated with risk drivers and supporting information explaining precisely what the risk entails.

The information associated with Insights may be queried and visually represented on Front End UI 1028 in a variety of different manners. For example, enterprise risk model 500 may be queried to generate a data set identifying nodes of network 110 that have a risk of security breach higher than a particular threshold. This threshold may be programmatically determined based on risk of a security breach in relation to the plurality of features shared by nodes of network 110 or based on a global distribution of nodes. For example, all risks deemed to be a "high risk," or riskier than a particular risk threshold may be displayed.

Alternately, the risks of a security breach presented to network 110 may be presented in an ordered sequence based on a function of impact value and risk of a security breach. The top 3 risks (or any number of risks ranked in order of severity) of a security breach in terms of impact to network 110 according to an embodiment of the invention. This listing may correspond to those risks having the greatest likelihood of causing the most significant impact to network 110. In other words, a security breach which is the most likely breach in security to occur, but which has little impact to the network 110 as measured by its impact value, may not be listed as a top risk of a security breach in terms of impact to network 110.

The risks of a security breach on a particular node of network 110 may be presented to the user upon request using Front End UI 1028. In an embodiment, using enterprise risk model 500, a graph depicting data, or the raw data itself, describing a particular node's risk of a security breach relative to other nodes on network 110 may be generated and displayed. This type of embodiments enables a viewer to ascertain which nodes of network 110 are most at risk and most secure relative to other nodes of network 110. In other embodiments, using enterprise risk model 500, a graph depicting data, or the raw data itself, describing a particular node's risk of a security breach relative to nodes on other networks besides network 110 may be generated and displayed. This type of embodiments provides some guidance on how secure a particular node is relative to widely experienced levels of risk so as to provide some perspective as to how much risk of a security breach a particular node on network 110 possess relative to a global norm.

In an embodiment, after generating the statistical likelihood of a risk of a security breach for each node of network 110 using enterprise risk model 500, for at least a subset of nodes of network 110, the nodes may be displayed in an ordered list based on their likelihood of being compromised due to a security breach. In this way, an administrator can quickly ascertain which nodes are a priority for enhancing their defenses based on their impact network 110 if the nodes succumb to malicious code.

Insight Implementation and Usage

An Insight may be associated with a particular type of method for breaching network security. Such types of breach methods may correspond to the categories depicted in FIG. 4A for example. Each Insight may be associated to a breach method categories vis-à-vis a number or other such identifier assigned to each category.

In contrast to an Insight, a Feature is a processed observation that aids in the computation of Risk, but is not easily actionable. The challenge of ensuring the security of a network is that the set of features of nodes of the network is much larger than the set of Insights—this is the "gap" between available mitigations and the needed mitigations to reduce the risk of breach below a certain acceptable level. Furthermore, note that acting upon an Insight may not necessarily reduce the risk of a security breach, as other important risk features may play a more important role.

An Insight may be present on any number of nodes or devices. An Insight may be associated with more than one type of breach method category. However, the risk associated with each breach method category for a given Insight may be different. To calculate the cost of an Insight i for a network, the total impact of all devices (d) associated with this Insight is calculated by:

$$\text{Total impact of this insight } i = \sum_{d}^{i \in d} \text{Impact}(d)$$

$$\text{Total weighted impact of this insight} = \frac{1}{\min(BMTcost)_i} \times \sum_{d}^{i \in d} \text{Impact}(d)$$

Clustered impacts may be sorted by total weighted impact and displayed on Front End UI 1028.

Figure 17:
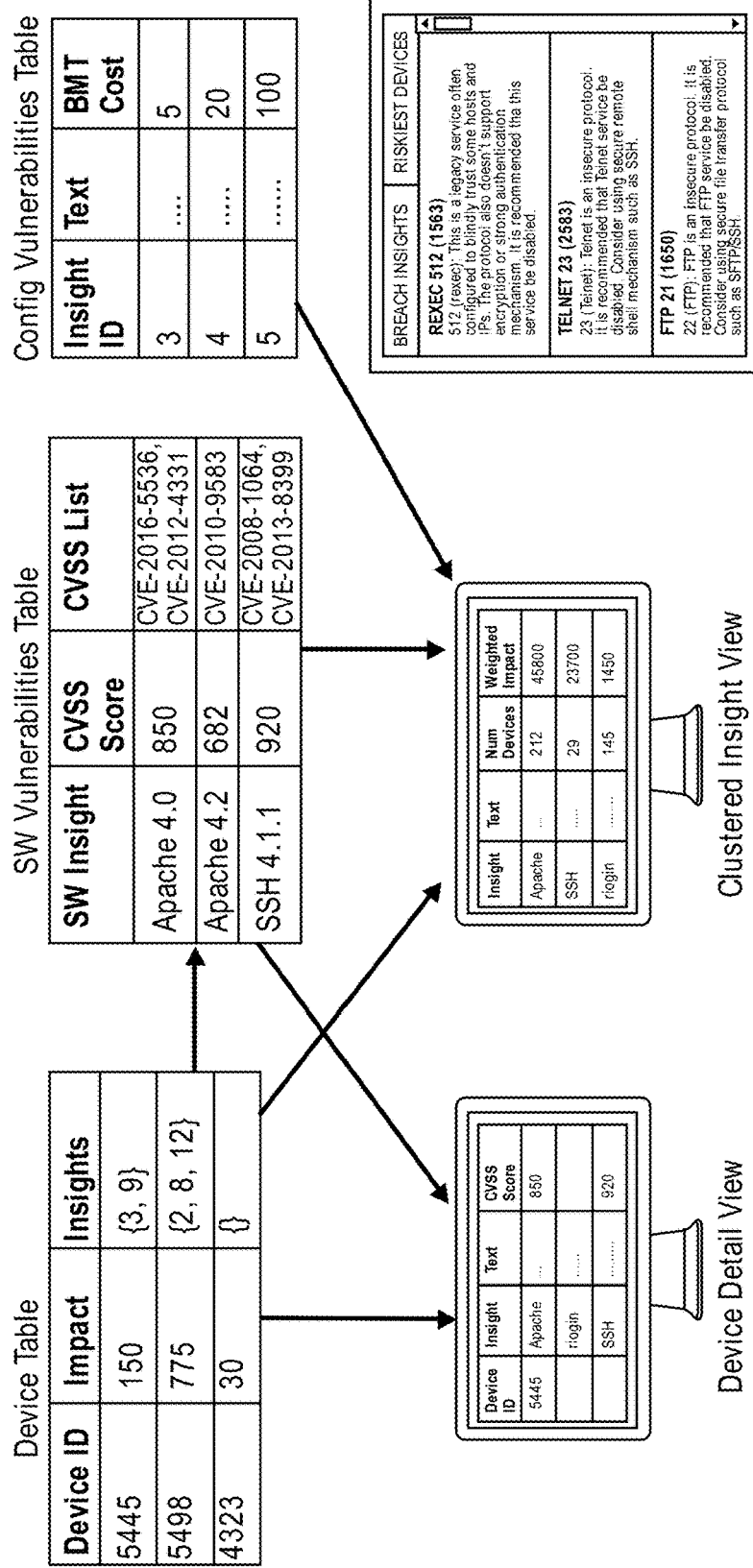
FIG. 17 is an illustration of clustered Insights according to an embodiment of the invention.

FIG. 17 is an illustration of clustered Insights according to an embodiment of the invention. FIG. 17 depicts three exemplary database tables, namely, Device Table, SW Vulnerabilities Table (which stores information about a software vulnerability Insight), and a Config Vulnerability Table (which stores information about a configuration vulnerability Insight). Each of these tables may be stored in one or more databases 1014 or 1024 and represent simplified examples for explanation purposes.

Information stored in these tables may be queried and displayed on Front End UI 1028 in a variety of manners. As one example, the Device Detail View shown on FIG. 17 depicts all the Insights associated with a particular node, namely the node associated with device id 5445. Thus, an administrator can quickly see the greatest risks of a security breach to that node. As another example, the Clustered Insight View enables an administrator to ascertain the greatest types of threats to security for the entire network. The Insights listed on the Clustered Insight View identify risks presented by a number of different nodes or devices and are ordered based on risk (weighted impact) to the network. FIG. 17 also depicts an exemplary user interface for viewing specific breach Insights as well as an ordered list of the riskiest devices.

FIG. 18 is an illustration of an example impact model according to an embodiment to calculate the impact to the enterprise caused by breaching a particular device. The information depicted in FIG. 18 is considered in the impact model when identifying the impact of a particular feature. Such information may include the role performed by node, how much and what type of information does the node comprise, in which portion of the organization is the node deployed, in which business unit is the node deployed, what type of machine is the node, what are the specific server and storage capabilities of the node, and so on.

Modeling Risk of a Security Breach Across Different Paths

While embodiments of the invention may be used to ascertain the risks of a security breach relative to each node of network 110, it is noted that as nodes of network 110 may communicate with each other, the ecosystem of network 110 is interconnected. A security breach to a particular node may, in the course of infection, be propagated across multiple nodes of network 110.

Figure 19:
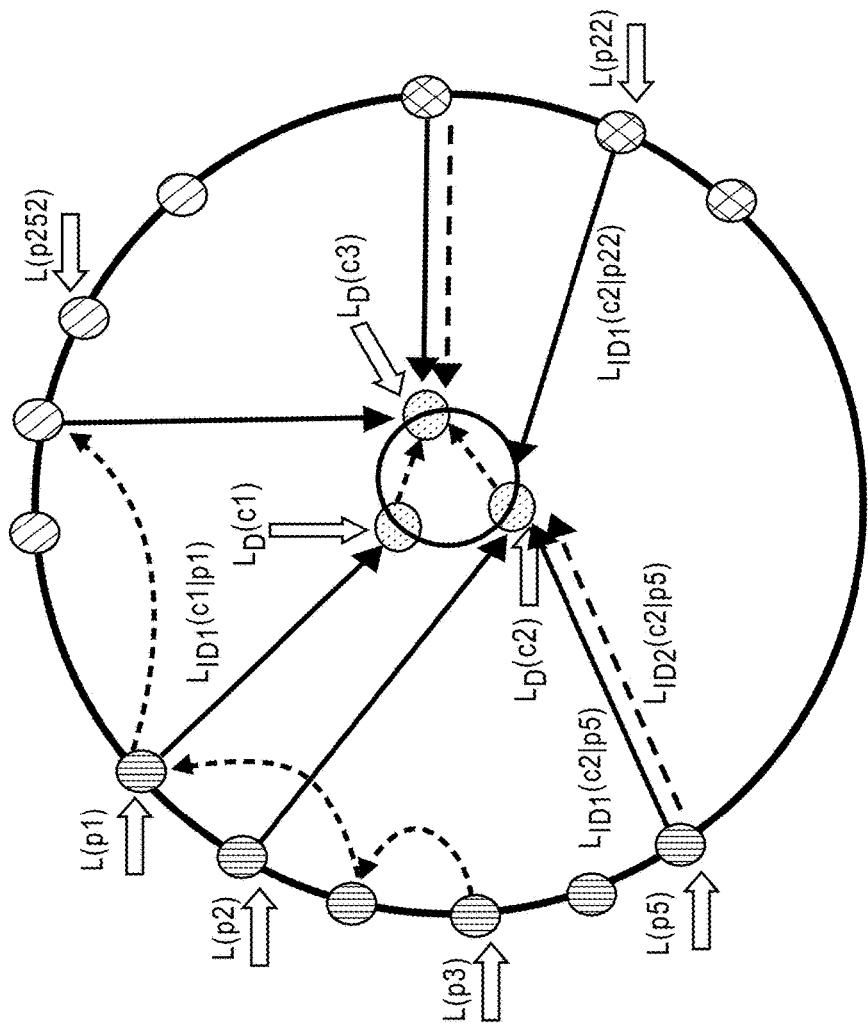
FIG. 19 is an illustration of propagation of a security breach across multiple hops according to an embodiment of the invention.

Embodiments of the invention take care to observe and track the risk of security breaches which may be carried out across multiple hops across nodes of network 110. FIG. 19 is an illustration of propagation of a security breach across multiple hops according to an embodiment of the invention. Enterprise risk model 500 models a risk of security breach from the perimeter to each node residing in the core. Such a risk may involve the spread of malware from the perimeter of network 110 to the core of network 110 via a multi-hop path.

Embodiments may stochastically evaluate the likelihood of a security breach at each node of network 110. As shown below in Equation 4, the likelihood of a node in the core being breached is equal to the likelihood of being attacked directly (which is hopefully zero percent) joined with the likelihood of the perimeter being breached, followed by an attack via the perimeter.

$$\bigcup_{d \in C} L(d) = L_{Self}(d) \cup L(d \mid P) \cdot L(P) \qquad \text{Equation 4}$$

Thus, the likelihood of breaching a device d in the core (represented as $$\bigcup_{d \in C} L(d))$$

is an union of two likelihoods. First, the device may be breached directly (represented as $L_{Self}(d)$). Alternatively, the device may be breached via the perimeter. In the latter case, the likelihood is a multiplication of the likelihood of breaching the perimeter (represented as $L(P)$), and the conditional likelihood of breaching device d, once the perimeter has been breached (represented using traditional conditional probability notation as $L(d|P)$).

Due to the presence of numerous nodes on the perimeter, the likelihood of the perimeter being breached is shown in below in Equation 5.

$$L(P) = 1 - \prod_{p}^{P}(1 - L)(p)) \approx 1 \qquad \text{Equation 5}$$

As the number of devices in the perimeter P gets large, this expression may be approximated as 1. In other words, the chance of some node somewhere in the perimeter being breached is very close to 1, when there are a large number of nodes in the perimeter.

Consequently, the likelihood of a node being breached in the core is shown in Equation 6 as the likelihood of being attacked directly joined with the likelihood of being attacked via the perimeter.

$$\bigcup_{d \in C} L(d) = L_S(d) \cup L_P(d) \qquad \text{Equation 6}$$

Thus, for each node in the core, a determination is made to obtain the joint conditional probability across all perimeter nodes and propagation types. For each potential hop in a multi-hop attack vector, the probability for an attack being successful from a perimeter node to a perimeter node and an attack from a core node to a core node is made. All potential propagation paths from the perimeter to the core and from multiple hops on the perimeter before breaching the core are computed. Thus, enterprise risk model 500 can scientifically determine where the risk of a security breach arises for each node in the core of network 110.

Hardware Mechanisms

Figure 20:
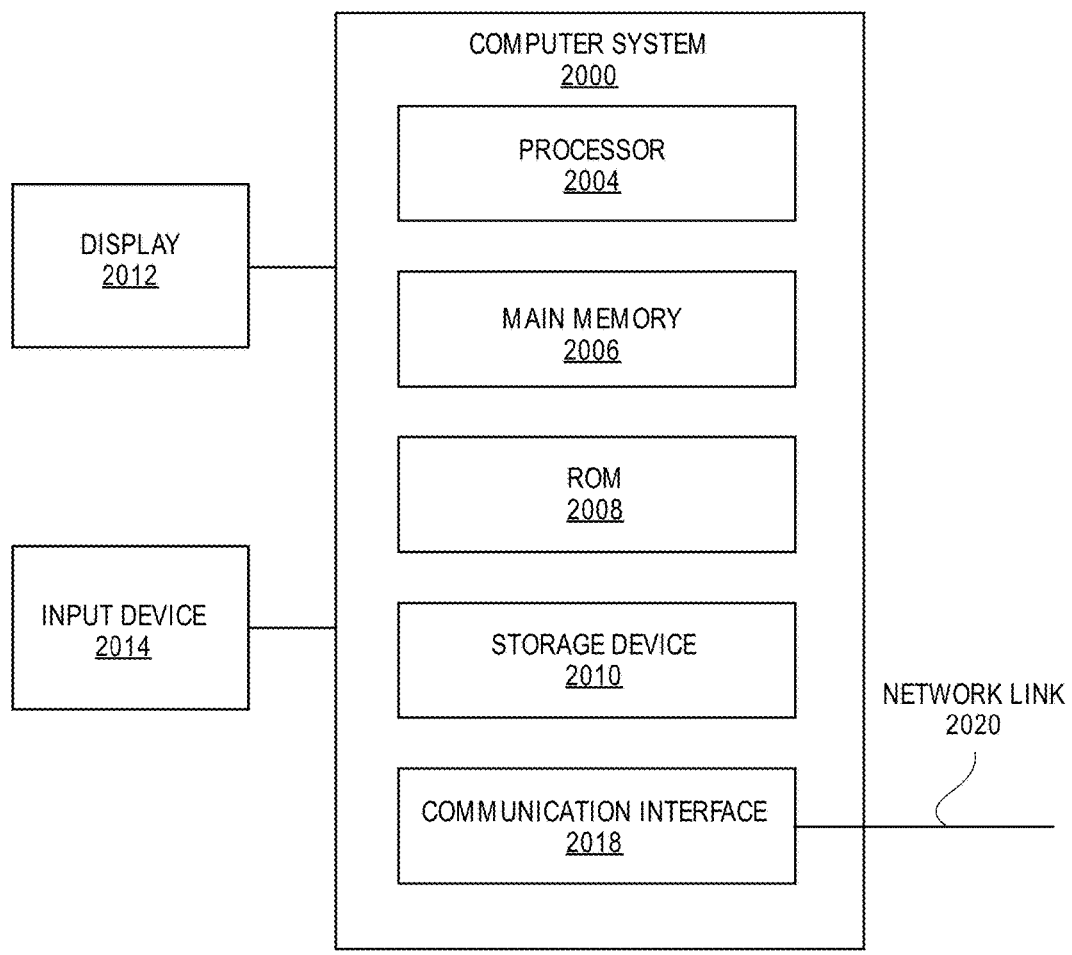
FIG. 20 is a block diagram that illustrates a computer system upon which an embodiment of the invention may be implemented.

In an embodiment, all nodes of enterprise network and risk modeler server 190 depicted in FIG. 1 may be implemented by one or more computer systems. FIG. 20 is a block diagram that illustrates a computer system 2000 upon which an embodiment of the invention may be implemented. In an embodiment, computer system 2000 includes processor 2004, main memory 2006, ROM 2008, storage device 2010, and communication interface 2018. Computer system 2000 includes at least one processor 2004 for processing information. Computer system 2000 also includes a main memory 2006, such as a random access memory (RAM) or other dynamic storage device, for storing information and instructions to be executed by processor 2004. Main memory 2006 also may be used for storing temporary variables or other intermediate information during execution of instructions to be executed by processor 2004. Computer system 2000 further includes a read only memory (ROM) 2008 or other static storage device for storing static information and instructions for processor 2004. A storage device 2010, such as a magnetic disk or optical disk, is provided for storing information and instructions.

Computer system 2000 may be coupled to a display 2012, such as a cathode ray tube (CRT), a LCD monitor, and a television set, for displaying information to a user. An input device 2014, including alphanumeric and other keys, is coupled to computer system 2000 for communicating information and command selections to processor 2004. Other non-limiting, illustrative examples of input device 2014 include a mouse, a trackball, or cursor direction keys for communicating direction information and command selections to processor 2004 and for controlling cursor movement on display 2012. While only one input device 2014 is depicted in FIG. 20, embodiments of the invention may include any number of input devices 2014 coupled to computer system 2000.

Embodiments of the invention are related to the use of computer system 2000 for implementing the techniques described herein. According to one embodiment of the invention, those techniques are performed by computer system 2000 in response to processor 2004 executing one or more sequences of one or more instructions contained in main memory 2006. Such instructions may be read into main memory 2006 from another machine-readable medium, such as storage device 2010. Execution of the sequences of instructions contained in main memory 2006 causes processor 2004 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in persistently storing instructions which may be provided to processor 2004 for execution. Such a medium may take many forms, including optical or magnetic disks, such as storage device 2010.

Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 2004 for execution. For example, the instructions may initially be carried on a magnetic disk of a remote computer. The remote computer can load the instructions into its dynamic memory and send the instructions over a network link 2020 to computer system 2000.

Communication interface 2018 provides a two-way data communication coupling to a network link 2020 that is connected to a local network. For example, communication interface 2018 may be an integrated services digital network (ISDN) card or a modem to provide a data communication connection to a corresponding type of telephone line. As another example, communication interface 2018 may be a local area network (LAN) card to provide a data communication connection to a compatible LAN. Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through a local network to a host computer or to data equipment operated by an Internet Service Provider (ISP).

Computer system 2000 can send messages and receive data, including program code, through the network(s), network link 2020 and communication interface 2018. For example, a server might transmit a requested code for an application program through the Internet, a local ISP, a local network, subsequently to communication interface 2018. The received code may be executed by processor 2004 as it is received, and/or stored in storage device 2010, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for modeling a risk of security breaches to a network, which when executed by one or more processors, cause:

one or more agents gathering, from multiple sources across the network, analysis data that identifies observed characteristics of one or more nodes of the network;

generating, using the analysis data, a multi-layer risk model for the network that comprises a first model layer that models an inherent risk of security breaches to assets of the network based on the observed characteristics of the one or more nodes;

generating, using the multi-layer model, a statistical likelihood of a risk of security breach for each node of the network; and providing, to a user, the statistical likelihood of the risk of security breach for at least one node of the network.

2. The non-transitory computer-readable storage medium of claim 1, wherein the one or more nodes of the network comprise both one or more habitable nodes and one or more opaque nodes, wherein the one or more habitable nodes each possess a computing environment conducive to installation of at least one of said one or more agents, and wherein the one or more opaque nodes each possess a computing environment not conducive to installation of the one or more agents.

3. The non-transitory computer-readable storage medium of claim 1, wherein the multi-layer model further comprises a second model layer that models a present state of the inherent risk to the assets of said network caused by global and temporal events.

4. The non-transitory computer-readable storage medium of claim 1, wherein the multi-layer model further comprises a third model layer that models a change to the risk of security breaches to the assets of said network in response to potential mitigative actions.

5. The non-transitory computer-readable storage medium of claim 1, wherein said observed characteristics include network observations, device observations, user observations, asset observations, and cloud-storage observations.

6. The non-transitory computer-readable storage medium of claim 1, wherein the multi-layer model models the risk of security breaches to the network based on a set of features possessed by one or more habitable nodes and the one or more opaque nodes, and wherein the set of features comprise (a) local features computed locally at the one or more habitable nodes, (b) local features computed by an agent in a local vicinity on the network of the one or more opaque nodes, and (c) remote features computed external to the node.

7. The non-transitory computer-readable storage medium of claim 1, wherein execution of the one or more sequences of instructions further cause:
programmatically generating a suggested impact value for a particular node by comparing a set of feature values for the particular node against a plurality of feature values for a plurality of other nodes.

8. The non-transitory computer-readable storage medium of claim 1, wherein execution of the one or more sequences of instructions further cause:
maintaining a separate copy of the multi-layer risk model for each of plurality of different networks, wherein said network is a member of said plurality of different networks; and
evolving each copy of the multi-layer risk model over time to model the unique risks associated with a particular network, of said plurality of different networks, to which said each copy of the multi-layer risk model is associated.

9. The non-transitory computer-readable storage medium of claim 1, wherein execution of the one or more sequences of instructions further cause:
generating, using the multi-layer model, a data set identifying nodes of the network having a risk of security breach higher than a threshold that is programmatically determined based on features of a plurality of networks other than said network.

10. The non-transitory computer-readable storage medium of claim 1, wherein execution of the one or more sequences of instructions further cause:
generating, using the multi-layer model, a representation of a particular node's risk of a security breach in relation to a plurality of features shared by nodes across a plurality of networks other than said network.

11. The non-transitory computer-readable storage medium of claim 1, wherein execution of the one or more sequences of instructions further cause:
generating, using the multi-layer model, a representation of the particular node's risk of a security breach in relation to the plurality of features shared by other nodes on said network.

12. The non-transitory computer-readable storage medium of claim 1, wherein execution of the one or more sequences of instructions further cause:
presenting, for at least a portion of nodes of the network, a list of nodes of the network in order of their likelihood of being compromised due to a security breach.

13. The non-transitory computer-readable storage medium of claim 1, wherein execution of the one or more sequences of instructions further cause:
generating and displaying an ordered list of risks of security breaches to the network;
in response to a selection of a particular risk in the ordered list of risks of security beaches, consulting the multi-layer model to obtain information about actionable drivers of the particular risk; and
displaying the information about the actionable drivers of the particular risk.

14. The non-transitory computer-readable storage medium of claim 1, wherein execution of the one or more sequences of instructions further cause:
generating, using the multi-layer model, for at least a portion of nodes of the network, a determination of how each node of the portion of the network will likely be compromised due to a security breach based on a statistical analysis of observed features of those nodes in the portion of the network.

15. The non-transitory computer-readable storage medium of claim 1, wherein said multi-layer risk model identifies, for each of the one or more habitable nodes and for each of the one or more opaque nodes, whether each node is located on a perimeter of the network or on a core of the network,
wherein the perimeter of the network corresponds to a first set of nodes of the network which can directly communicate with a public network,
wherein the core of the network corresponds to a second set of nodes of the network which do not directly communicate with a public network,
and wherein the multi-layer risk model models a risk of security breach from the perimeter to each node residing in the core.

16. The non-transitory computer-readable storage medium of claim 1, wherein said analysis data identifies, for each node in the core of the network, a path from the perimeter of the network to said each node in the core of the network having the highest likelihood of a security breach, wherein said path comprises two or more hops.

17. The non-transitory computer-readable storage medium of claim 1, wherein execution of the one or more sequences of instructions further cause:
identifying, using the analysis data, for each of a set of nodes on the network, a device type category and an operating system category based on a machine learning model.

18. The non-transitory computer-readable storage medium of claim 1, wherein execution of the one or more sequences of instructions further cause:

identifying, using the multi-layer risk model, a set of one or more direct risks to a particular node in a core of the network and a set of one or more indirect risks to the particular node in the core,
wherein each of the one or more direct risks and each of the one or more indirect risks is associated with (a) a path from a perimeter to the core, and (b) an impact value expressing a measure of severity of the risk.

19. The non-transitory computer-readable storage medium of claim 1, wherein execution of the one or more sequences of instructions further cause:
identifying, using the multi-layer risk model, a statistical likelihood of how a security breach may propagate through the network over time.

20. The non-transitory computer-readable storage medium of claim 1, wherein execution of the one or more sequences of instructions further cause:
augmenting the multi-layer risk model with insight data, wherein the automatically generated insights represents expert knowledge pertinent to the observations identified by the analysis data, and wherein the generated insight identifies one or more suggested remedies to address one or more of risks presented by said observations identified by the analysis data; and
presenting a subset of the insight data on a user interface, wherein said subset of insight data satisfies a set of automatically generated or user-specified criteria for filtering said insight data.

21. An apparatus for modeling a risk of security breaches to a network, comprising:
one or more processors; and
one or more non-transitory computer-readable storage mediums storing one or more sequences of instructions, which when executed, cause:
one or more agents gathering, from multiple sources across the network, analysis data that identifies observed characteristics of one or more nodes of the network;
generating, using the analysis data, a multi-layer risk model for the network that comprises a first model layer that models an inherent risk of security breaches to assets of the network based on the observed characteristics of the one or more nodes;
generating, using the multi-layer model, a statistical likelihood of a risk of security breach for each node of the network; and
providing, to a user, the statistical likelihood of the risk of security breach for at least one node of the network.

22. A method for modeling a risk of security breaches to a network, comprising:
one or more agents gathering, from multiple sources across the network, analysis data that identifies observed characteristics of one or more nodes of the network, wherein said one or more agents are implemented in one or more of hardware and software;
generating, using the analysis data, a multi-layer risk model for the network that comprises a first model layer that models an inherent risk of security breaches to assets of the network based on the observed characteristics of the one or more nodes;
generating, using the multi-layer model, a statistical likelihood of a risk of security breach for each node of the network, wherein said analysis data and said statistical likelihood of a risk of security breach for each node of the network are generated using one or more entities that are implemented in one or more of hardware and software; and
providing, to a user, the statistical likelihood of the risk of security breach for at least one node of the network, wherein said statistical likelihood of the risk is transmitted over a computer network or electronically displayed upon a physical display.

* * * * *